United States Patent
Sueyoshi et al.

(10) Patent No.: US 7,545,579 B2
(45) Date of Patent: Jun. 9, 2009

(54) ZOOM LENS SYSTEM AND IMAGE PICK-UP APPARAUS

(75) Inventors: Masafumi Sueyoshi, Kanagawa (JP); Daisuke Kuroda, Kanagawa (JP)

(73) Assignee: Sony Corporation (JP)

( * ) Notice: Subject to any disclaimer, the term of this patent is extended or adjusted under 35 U.S.C. 154(b) by 464 days.

(21) Appl. No.: 11/587,934

(22) PCT Filed: Feb. 15, 2006

(86) PCT No.: PCT/JP2006/302664

§ 371 (c)(1),
(2), (4) Date: Oct. 26, 2006

(87) PCT Pub. No.: WO2006/095545

PCT Pub. Date: Sep. 14, 2006

(65) Prior Publication Data

US 2008/0309798 A1 Dec. 18, 2008

(30) Foreign Application Priority Data

Mar. 11, 2005 (JP) .......................... P2005-068933

(51) Int. Cl.
G02B 15/14 (2006.01)
(52) U.S. Cl. ...................... 359/683; 359/684
(58) Field of Classification Search ................. 359/676, 359/683, 684

See application file for complete search history.

(56) References Cited

U.S. PATENT DOCUMENTS 3,682,529 A 8/1972 Fujii et al.

(Continued)

FOREIGN PATENT DOCUMENTS

JP 59-040616 3/1984

(Continued)

OTHER PUBLICATIONS

Extended European Search Report and Opinion dated Jun. 13, 2008 for corresponding European Application No. 06 71 3805.

(Continued)

Primary Examiner—Scott J Sugarman
(74) Attorney, Agent, or Firm—Rader Fishman & Grauer PLLC; Ronald P. Kananen

(57) ABSTRACT

There is provided a zoom lens system, compact and light in weight and having high image formation performance over the zoom entire range irrespective of object lens while covering the range from the broad angle side up to the telescopic end state side, which is used in video camera and/or digital still camera. A zoom lens system at least includes a first lens group GR1 having positive refractive power, a second lens group GR2 having negative refractive power, a third lens group GR3 having positive refractive power, a fourth lens group GR4 having positive refractive power, a fifth lens group GR5 having weak refractive power (including refractive power=0), and a sixth lens group GR6 having negative refractive power which are arranged in order from the object side to change spacings between the respective lens groups to thereby perform magnification changing or adjusting operation, wherein when group spacing between the i-th lens group and the j-th lens group at the wide-angle end state is $DW(i\text{-}j)$, and group spacing between the i-th lens group and the j-th lens group at the telescopic end state is $DT(i\text{-}j)$, the following conditional formulas (1), (2) and (3) are satisfied, and the fourth lens group GR4 is moved in the optical axis direction so that focusing operation is performed.

$$DW(1\text{-}2) < DT(1\text{-}2) \quad (1)$$

$$DW(2\text{-}3) > DT(2\text{-}3) \quad (2)$$

$$DW(5\text{-}6) > DT(5\text{-}6) \quad (3)$$

14 Claims, 13 Drawing Sheets

U.S. PATENT DOCUMENTS 6,061,180 A 5/2000 Hayakawa et al.
7,286,300 B2 * 10/2007 Kuroda et al. ............... 359/693

FOREIGN PATENT DOCUMENTS

| JP | 04-146407 | 5/1992 |
| JP | 09-184981 | 7/1997 |
| JP | 10-333039 | 12/1998 |
| JP | 11-223770 | 8/1999 |
| JP | 2001-350093 | 12/2001 |
| JP | 2004-037967 | 2/2004 |

OTHER PUBLICATIONS

International Search Report, International Application No.: PCT/JP2006/302664; actual completion date: Apr. 13, 2006; mailing date: Apr. 25, 2006.

Singapore Search Report and Written Opinion issue Nov. 12, 2008 for corresponding Singapore Patent Application 200607774-7.

* cited by examiner

ZOOM LENS SYSTEM AND IMAGE PICK-UP APPARAUS

TECHNICAL FIELD

The present invention relates to a novel zoom lens system and a novel image pick-up apparatus. More particularly, the present invention relates to a zoom lens system having excellent compactness and having high image formation performance irrespective of object distance while covering the range from the broad angle side up to the telescopic side, which is suitable for photographing optical system of digital input/output equipment such as digital still camera and/or digital video camera, etc.; and an image puck-up apparatus comprising such a zoom lens system.

This Application claims priority of Japanese Patent Application No. 2005-068933, filed on Mar. 11, 2005, the entirety of which is incorporated by reference herein.

BACKGROUND ART

In recent years, image pick-up apparatuses using solid-state image pick-up devices such as digital still camera, etc. are being popularized. Especially, with popularization of digital still camera, there is required a zoom lens having excellent compactness and having high image formation performance in the entire zooming range irrespective of object distance while covering the range from the broad angle side up to the telescopic side.

For example, in zoom lenses described in the Japanese Patent Application Laid Open No. 1992-146407 publication and the Japanese Patent Application Laid Open No. 1999-174324 publication, six lens groups consisting of positive lenses, negative lenses, positive lenses, negative lenses, positive lenses and negative lenses are provided to perform realization of high magnification changing or adjusting operation.

However, the zoom lenses described in the Japanese Patent Application Laid Open No. 1992-146407 publication and the Japanese Patent Application Laid Open No. 1999-174324 publication relate to exchange lens of single-lens reflex camera, etc., and are difficult in miniaturization and realization of broad angle because long back-focus for arrangement space of mirror for jumping up mirror, etc. must be ensured.

In view of the problems as described above, an object of the present invention is to provide a zoom lens system, compact and having high image formation performance over the entire zooming lens area irrespective of object lens while covering the range from the broad angle side up to the telescopic side, which is used in video camera and/or digital still camera; and an image pick-up apparatus using such a zoom lens system.

DISCLOSURE OF THE INVENTION

Problems to be Solved by the Invention

In order to solve the above-described problems, a zoom lens system of the present invention at least includes a first lens group GR1 having positive refractive power, a second lens group GR2 having negative refractive power, a third lens group GR3 having positive refractive power, a fifth lens group GR4 having positive refractive power, a fifth lens group GR5 having weak refractive power (including refractive power=0), and a sixth lens group GR6 having negative refractive power which are arranged in order from the object side to change spacing or spacings between the respective lens groups to thereby perform magnification changing and adjusting operation, wherein when group spacing between the i-th lens group and the j-th lens group at the wide-angle end state is DW(i-j), and group spacing between the i-th lens group and the j-th lens group at the telescopic end state is DT(i-j), the following conditional formulas (1), (2) and (3) are satisfied, $$DW(1-2)<DT(1-2) \tag{1}$$

$$DW(2-3)>DT(2-3) \tag{2}$$

$$DW(5-6)>DT(5-6), \text{ and} \tag{3}$$

the fourth group GR4 is moved in the optical axis direction so that focusing operation is performed.

Moreover, the image pick-up apparatus of the present invention is directed to an image pick-up apparatus comprising a zoom lens system consisting of plural groups and serving to change group spacing or spacings to perform magnification changing or adjusting operation, and an image pick-up device for converting an optical image formed by the zoom lens system into an electric signal, the zoom lens system including a first lens group GR1 having positive refractive power, a second lens group GR2 having negative refractive power, a third lens group GR3 having positive refractive power, a fourth lens group GR4 having positive refractive power, a fifth lens group GR5 having weak refractive power (including refractive power=0), and a sixth lens group GR6 having negative refractive power which are arranged in order from the object side to change spacing or spacings between the respective lens groups to thereby perform magnification changing or adjusting operation, wherein when group spacing between the i-th lens group and the j-th lens group at the wide-angle end state is DW(i-j), and group spacing between the i-th lens group and the j-th group at the telescopic end state is DT(i-j), the following conditional formulas (1), (2) and (3) are satisfied, $$DW(1-2)<DT(1-2) \tag{1}$$

$$DW(2-3)>DT(2-3) \tag{2}$$

$$DW(5-6)>DT(5-6), \text{ and} \tag{3}$$

the following lens group GR4 is moved in the optical axis direction so that focusing operation is performed.

Accordingly, in the zoom lens system of the present invention, miniaturization and high magnification can be realized. Moreover, in the image pick-up apparatus of the present invention, the zoom lens system of the present invention is used to thereby have to ability to realize miniaturized configuration thereof, and to have ability to perform photographing by high magnification over a range from the broad angle range side up to the telescopic range side.

Moreover, at least six lens groups are provided to change group spacings between the respective lens groups at the time of changing or adjusting magnification, thereby making it possible to attain compact and high magnification zoom lens system in which movement quantity of the lens entire system is relatively small. Further, the fourth lens group GR4 having small lens diameter is caused to be focus group to thereby permit the drive system of the focus group to be compact so that AF (Auto Focus) speed can be resultantly increased.

Further, in the image pick-up apparatus of the present invention, the zoom lens system of the present invention is used so that photographing by high magnification can be performed from the broad angle range up to the telescopic range although its configuration is small. In addition, convenience of use becomes satisfactory by high speed AF, and it becomes possible to precisely capture shutter chance.

In the inventions described in the claims 2 and 9, since the third and fifth lens groups GR3 and GR5 are moved in one body along on the optical axis in magnification changing or adjusting operation, the third, the fourth and the fifth lens groups GR3, GR4 and GR5 can be constituted by single cam cylinder. If there is employed a configuration to move the fourth lens group GR4 serving as the focus group therea-mong, not only mechanical configuration becomes easy, but also relative positioning of the third, the fourth and the fifth lens groups GR3, GR4 and GR5 which are apt to be rigorous in tolerance in manufacturing becomes easy.

In the inventions described in the claims 3 and 10, since the spacing between the third lens group GR3 and the fourth lens group GR4 and the spacing between the lens group GR4 and the lens group GR5 satisfy the conditional formulas (4) DW(3-4)<DT(3-4) and (5) DW(4-5)>DT(4-5), high image formation performance is exhibited within the zooming area and within the focusing area irrespective of object distance.

In the inventions described in the claims 4 and 11, since the fifth lens group GR5 is constituted by single lens having at least one non-spherical surface, and the conditional formula (6) -0.4<fw/fg5<0.4 is satisfied when the focal length of the fifth lens group GR5 is fg5 and the focal length at the wide-angle end state of the entire system is fw, various aberrations including spherical aberration taking place in change of object distance are effectively corrected so that satisfactory image performance can be obtained at all photographing dis-tances.

In the inventions described in the claims 5 and 12, since when back focus (air conversion length) at the wide-angle end state is Twbf and focal length at the wide-angle end state of the entire system is fw, the conditional formula (7) 0.2<Twbf/fw<1.2 is satisfied, realization of broad angle cannot be obstructed while preventing enlargement of lens front gem (lens front optical element). In addition, dust, etc. is permitted to be difficult to be conspicuous at the time of minimum iris.

In the inventions described in the claims 6 and 13, since the sixth lens group GR6 at least includes one negative lens having negative refractive power and one positive lens having positive refractive power which are arranged in order from the object side, peripheral rays of light are jumped upwards by the positive lens and are suppressed by the positive lens so that realization of broad angle becomes easy while suppress-ing distortion aberration, and incident angle onto the image pick-up device can be gentle (small) and magnification color aberration can be also effectively corrected. Moreover, since when lateral magnification at the telescopic end state of the sixth lens group GR6 is βtg6, the conditional formula (8) 1.1<βtg6<2.0 is satisfied, miniaturization of the lens entire system can be attained so that photographing at nearer dis-tance can be made.

In the inventions described in the claims 7 and 14, since the sixth lens group GR6 at least one negative lens having nega-tive refractive power and one positive lens having positive refractive power which are arranged in order from the object side, and the conditional formula (9) 1.05<βwg6<1.5 is sat-isfied when lateral magnification at the wide-angle end state of the sixth lens group GR6 is βwg6, it is possible to ensure, while avoiding enlargement of the lens entire system, enlargement ratio by movement of the sixth lens group GR6 so that it becomes equal to a predetermined value.

BEST MODE FOR CARRYING OUT THE INVENTION

Figure 1:
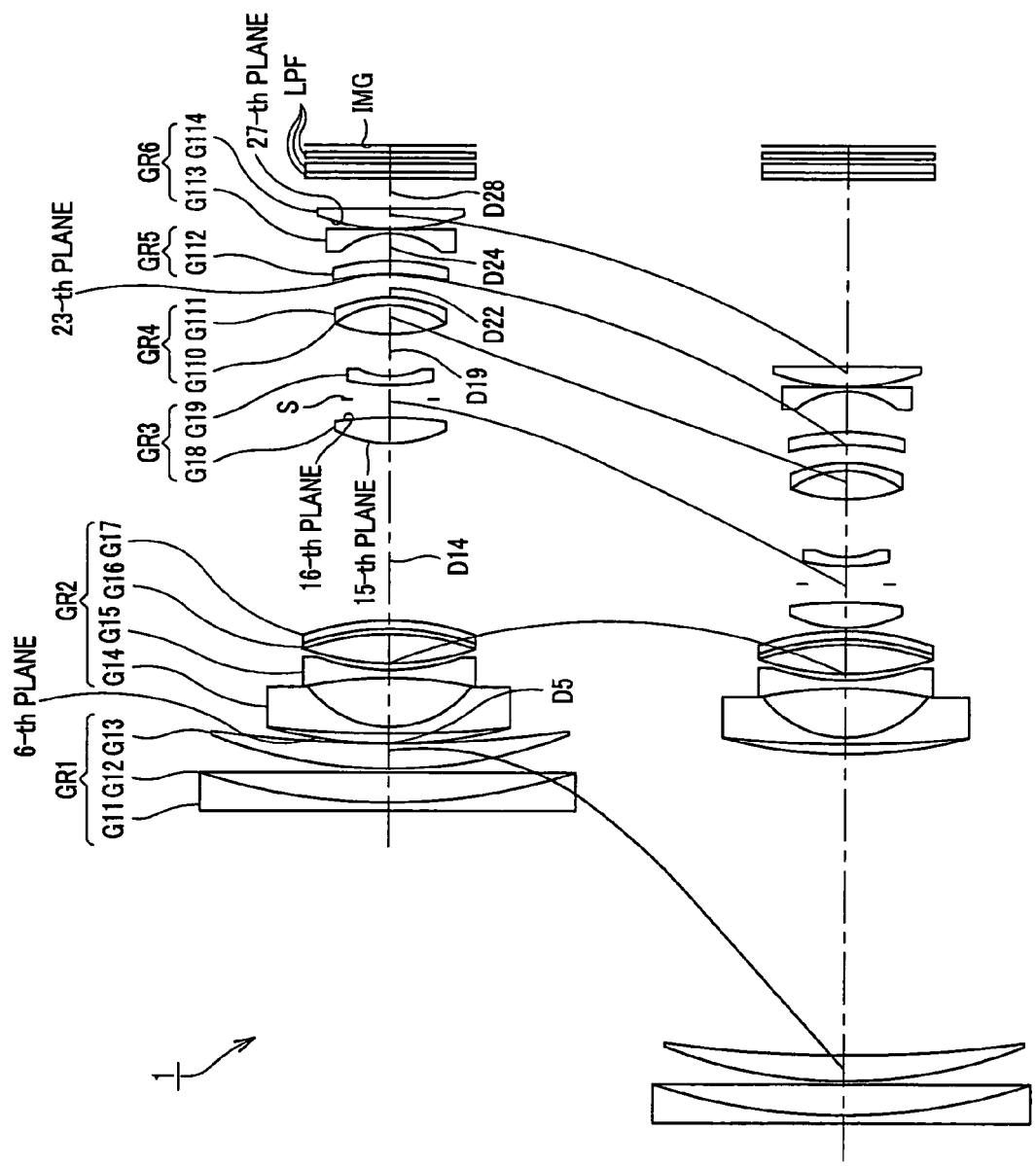
FIG. 1 is a view showing lens configuration of a first embodiment of a zoom lens system of the present invention.

Best mode for carrying out a zoom lens system and an image pick-up apparatus of the present invention will now be explained with reference to the attached drawings.

The zoom lens system of the present invention at least includes a first lens group GR1 having positive refractive power, a second lens group GR2 having negative refractive power, a third lens group GR3 having positive refractive power, a fourth lens group GR4 having positive refractive power, a fifth lens group GR5 having weak refractive power ("refractive power=0", i.e., the case where there is no refrac-tive power on the axis is also included in "weak refractive power"), and a sixth lens group GR6 having negative refrac-tive power to change spacing or spacings between the respec-tive lens groups to thereby perform magnification changing or adjusting operation, wherein when group spacing between the i-th lens group and the j-th lens group at the wide-angle end state is DW(i-j), and group spacing between the i-th lens group and the j-th group at the telescopic end state is DT(i-j), the following conditional formulas (1), (2) and (3) are satis-fied, and the fourth lens group GR4 is moved in the optical axis direction so that focusing operation is performed.

$$DW(1-2)<DT(1-2) \tag{1}$$

$$DW(2-3)>DT(2-3) \tag{2}$$

$$DW(5-6)>DT(5-6) \tag{3}$$

As stated above, at least six lens groups are provided to change respective lens group spacings at the time of magnification changing or adjusting operation, thereby making it possible to attain compact and high magnification zoom lens system in which movement quantity of the lens entire system is relatively small. Moreover, the fourth lense group GR4 is caused to be focus group to thereby have ability to realize miniaturized configuration of the focus group and to have ability to attain high image formation performance irrespective of photographing distance as compared to the conventional case where the first lens group or the second lens group is caused to be focus group, and to further have ability to realize miniaturized configuration of the drive mechanism of the focus group. Furthermore, since the focus group can be moved at a high speed and with high stop accuracy, high speed AF (Auto Focus) can be realized so that high image formation performance can be obtained.

The conditional formula (1) prescribes the spacing between the first and second lens groups GR1 and GR2 in magnification changing or adjusting operation from the wide-angle end state up to the telescopic end state, and the conditional formula (2) prescribes the spacing between the second and third lens groups GR2 and GR3 in magnification changing or adjusting operation from the wide-angle end state up to the telescopic end state. When these conditional formulas are satisfied, great magnification changing or adjusting action can be performed from the wide-angle end state up to the telescopic end state.

The conditional formula (3) prescribes the spacing between the fifth lens group GR5 and the sixth lens group GR6 in magnification changing or adjusting operation from the wide-angle end state to the telescopic end state. When these conditional formulas are satisfied, magnification changing or adjusting action can be exhibited while satisfactorily correcting various aberrations.

It is desirable that the third and fifth lens groups GR3 and GR5 are moved in one body along on the optical axis in magnification changing or adjusting operation. Thus, it becomes possible to constitute, by single cam cylinder, the third, fourth and fifth lens groups GR3, GR4 and GR5. If there is employed a configuration to move the fourth lens group GR4 serving as focus group thereamong, not only mechanical configuration becomes easy, but also relative positioning of the third, fourth and fifth lens groups GR3, GR4 and GR5 which are apt to be rigorous in tolerance in manufacturing becomes easy.

It is desirable that spacing between the third lens group GR3 and the fourth lens group GR4 and spacing between the lens group GR4 and GR5 satisfy the following conditional formulas (4), (5).

$$DW(3-4)<DT(3-4) \qquad (4)$$

$$DW(4-5)>DT(4-5) \qquad (5)$$

The conditional formula (4) prescribes the spacing between the third lens group GR3 and the fourth lens group GR4 serving as the focus group in magnification changing or adjusting operation from the wide-angle end state up to the telescopic end state, and the conditional formula (5) prescribes the spacing between the fourth lens group GR4 serving as focus group and the fifth group GR5 in magnification changing or adjusting operation from the wide-angle end state up to the telescopic end state. When these conditional formulas are satisfied, not only change of image surface curvature by focusing is suppressed while ensuring movement quantity of the fourth lens group GR4 serving as focusing lens group at the time of focusing, but also change of spherical aberration taking place by change of object lens can be satisfactorily corrected by changing spacings before and after the focus lens group to thereby generate changes in directions opposite to each other to cancel them.

It is desirable that the fifth lens group GR5 is constituted by single lens having at least one spherical surface, and the following conditional formula (6) is satisfied when focal length of the fifth lens group GR5 is fg5 and focal length at the wide-angle end state of the entire system is fw.

$$-0.4<fw/fg5<0.4 \qquad (6)$$

The fifth lens group GR5 is caused to have at least one non-spherical surface so as to cancel change of spherical aberration by movement at the time of focusing of the fourth lens group GR4 serving as the focus group, whereby even when object distance is changed from infinity to proximity, change of spherical aberration is reduced so that satisfactory image formation performances can be obtained at all photographing distances.

The conditional formula (6) prescribes ratio between focal length of the fifth lens group GR5 having weak refractive power and focal length at the wide-angle end state in the lens entire system. In the case where value of fw/fg5 is −0.4 or less, negative power of the fifth lens group GR5 becomes too strong. As a result, image surface change quantity with respect to movement quantity of the fourth lens group serving as the focus group becomes large. This is not preferable from a viewpoint of AF control. Moreover, in the case where value of fw/fg4 is 0.4 or more, it is necessary to weaken positive power of the fourth lens group GR4 serving as focus group. As a result, the movable range of the forth lens group GR4 at the time of focusing becomes large. Thus, miniaturization of the entirety of the lens system becomes difficult.

It is desirable that when back focus (air conversion length) at the wide-angle end state is Twbf and focal length at the wide-angle end state of the entire system is fw, and the following conditional formula (7) is satisfied.

$$0.2<Twbf/fw<1.2 \qquad (7)$$

The conditional formula (7) prescribes the ratio between back focus length at the wide-angle end state and the focal length of the lens entire system at the wide-angle end state. Namely, in the case where value of Twbf/fw is 0.2 or less, low-pass filter (LPF) and/or infrared (IR) shielding glass become extremely close to the image pick-up device surface, so dust attached to the LPF and/or the IR shielding glass, and/or defect of the LPF or the IR shielding glass become apt to be conspicuous at the time of minimum iris. Moreover, in the case where value of Twbf/fw is 1.2 or more, the lens front gem becomes large. As a result, not only miniaturization becomes difficult, but also realization of broad angle becomes difficult.

The sixth lens group GR6 at least includes one negative lens having negative refractive power and one positive lens having positive refractive power which are arranged in order from the object side, and it is desirable that when lateral magnification at the wide-angle end state of the sixth lens group GR6 is βtg6, the following conditional formula (8) is satisfied.

$$1.1<\beta tg6<2.0 \qquad (8)$$

At least one negative lens having negative refractive power and one positive lens having positive refractive power are provided in order from the object side to jump upwards peripheral rays of light by the negative lens and to suppress them by the positive lens so that realization of broad angle becomes easy while suppressing distortion aberration. Thus, it is possible to allow incident angle onto the image pick-up device to be gentle or small. In addition, it is also possible to effectively correct magnification color aberration.

The conditional formula (8) prescribes the lateral magnification of the sixth lens group GR6 at the telescopic end state. Thus, since it is possible to extend an image at a stroke, the lens entire system can be miniaturized. Moreover, since the sixth lens group GR6 has large magnification, even in the case where large-sized image pick-up device is used, photographing up to short-distance side can be made. Thus, closest range can be gained. In the case where value of βtg6 is 1.1 or less, enlargement ratio by the sixth lens group GR6 is reduced. As a result, not only miniaturization of the lens entire system becomes difficult, but also closest range is elongated. In addition, in the case where value of βtg6 is 2.0 or more, assembling accuracy of lenses becomes very rigorous. This is not preferable from a manufacturing point of view.

The sixth lens group GR6 at least includes a negative lens having negative refractive power and a positive lens having positive refractive power which are arranged in order from the object side, and it is desirable that when lateral magnification at the wide-angle end state of the sixth lens group GR6 is βwg6, the following conditional formula (9) is satisfied.

$$1.05 < \beta wg6 < 1.5 \quad (9)$$

The conditional formula (9) prescribes magnification of the sixth lens group GR6 at the wide-angle end state. In the case where value of βwg6 is 1.05 or less, enlargement ratio by the sixth lens group GR6 is reduced. As a result, miniaturization of the lens entire system becomes difficult. Moreover, in the case where value of βwg6 is 1.5 or more, assembling accuracy of lenses becomes very rigorous, and it becomes difficult to ensure magnification by movement of the sixth lens group GR6. Thus, the lens entire system becomes large.

It is desirable that at least one of respective planes or plane surfaces of lenses constituting the second lens group GR2 is constituted by non-spherical surface. Thus, it is possible to effectively correct distortion aberration or comatic aberration at the wide-angle end state. As a result, it is possible to attain compactness and high performance.

It is desirable that at least one of respective plane surfaces of lenses constituting the sixth lens group GR6 is constituted by non-spherical surface. Thus, it becomes possible to effectively correct image surface bending or curvature or comatic aberration at the peripheral range.

Three embodiments of the zoom lens system of the present invention and numeric value embodiments in which practical numeric values are applied to these embodiments will now be explained with reference to FIGS. 1 to 12 and Tables 1 to 11.

It is to be noted that non-spherical surface is used, and the non-spherical surface shape is represented by the following formula (1)

[Formula 1]

$$x = \frac{y^2 \cdot c^2}{1 + (1 - (1+K) \cdot y^2 \cdot c^2)^{1/2}} + \sum A^i \cdot y^i \quad (1)$$

In the above formula, y: height in a direction perpendicular to the optical axis x: distance in the optical axis direction from lens surface summit point c: paraxial curvature at lens summit point k: conic constant $A^i$: the i-th non-spherical coefficient.

FIG. 1 shows the lens configuration according to the first embodiment of the zoom lens system of the present invention.

There are arranged, in order from the object side, a first lens group GR1 having positive refractive power, a second lens group GR2 having negative refractive power, a third lens group GR3 having positive refractive power, a fourth lens group GR4 having positive refractive power, a fifth lens group GR5 having negative refractive power, and a sixth lens group GR6 having negative refractive power. In magnification changing or adjusting operation from the wide-angle end state up to the telescopic end state, the respective lens groups are moved on the optical axis as indicated by solid lines from the state shown at the upper row of FIG. 1 to the state shown at the lower row.

The first lens group GR1 is composed of a connection lens of a negative lens G11 and a positive lens G12 which are arranged in order from the object side. The second lens group GR2 is composed of a negative lens G14 having composite non-spherical surface at the object side, a negative lens G15, a positive lens G16, and a negative lens G17 which are arranged in order from the object side. The third lens group GR3 is composed of a positive lens G18 having non-spherical surfaces at the both surfaces thereof, an iris S, and a negative lens G19 which are arranged in order from the object side. The fourth lens group GR4 is comprised of a connection lens of a positive lens G110 and a negative lens G111. The fifth lens group GR5 is comprised of a negative lens G112 having non-spherical surfaces at the object side. The sixth lens group GR6 is composed of a negative lens G113, and a positive lens G114 having non-spherical surface at the object side which are arranged in order from the object side.

Moreover, in the first embodiment and the second and third embodiments which will be described later, a parallel plane-plate shaped low-pass filter LPF is inserted between the last lens surface of the zoom lens system and the image pick-up surface IMG. In this example, as the low-pass filter LPF, there can be applied a double-refraction type low-pass filter using, as material, quartz having a crystal axis direction adjusted to be a predetermined direction, and phase-type low-pass filter adapted for attaining, by diffraction effect, required optical cut-off frequency characteristic.

Values of various elements of numeric value embodiment 1 in which practical numeric values are applied to the above-described embodiment is shown in Table 1. In the various elements Tables of the numeric value embodiment 1 and respective numeric value embodiments which will be explained later, plane No. indicates the i-th plane or plane surface from the object side, R indicates curvature of radius of the i-th plane surface, D indicates axial spacing between the i-th plane surface and the (i+1)-th plane surface, Nd indicates refractive index with respect to d line (λ=587.6 nm) of nitric material having the i-th plane surface at the object side, and Vd indicates Abbe number with respect to d line of nitric material having the i-th plane surface at the object side. Moreover, plane indicated at 'ASP' indicates non-spherical surface. Curvature of radius 'INFINITY' indicates plane.

TABLE 1

| PLANE NO. | R | | D | Nd | Vd |
|---|---|---|---|---|---|
| 1 | 500.000 | | 1.8000 | 1.8467 | 23.785 |
| 2 | 101.447 | | 5.091 | 1.7725 | 49.624 |
| 3 | 1900.437 | | 0.200 | | |
| 4 | 75.849 | | 4.843 | 1.8350 | 42.984 |
| 5 | 236.882 | | variable | | |
| 6 | 688.988 | ASP | 0.200 | 1.5273 | 44.348 |
| 7 | 125.517 | | 1.600 | 1.8350 | 42.984 |
| 8 | 16.547 | | 8.068 | | |
| 9 | −75.218 | | 1.100 | 1.8350 | 42.984 |
| 10 | 35.720 | | 1.206 | | |
| 11 | 37.867 | | 4.619 | 1.8467 | 23.785 |
| 12 | −62.091 | | 1.282 | | |
| 13 | −38.000 | | 1.100 | 1.8350 | 42.984 |

TABLE 1-continued

| PLANE NO. | R | | D | Nd | Vd |
|---|---|---|---|---|---|
| 14 | −60.969 | | variable | | |
| 15 | 17.363 | ASP | 4.662 | 1.5831 | 59.461 |
| 16 | −44.488 | ASP | 2.500 | | |
| IRIS | INFINITY | | 3.000 | | |
| 18 | 29.129 | | 1.200 | 1.9229 | 20.880 |
| 19 | 15.230 | | variable | | |
| 20 | 24.413 | | 5.336 | 1.4970 | 81.608 |
| 21 | −13.540 | | 0.900 | 1.8340 | 37.345 |
| 22 | −21.800 | | variable | | |
| 23 | −34.509 | ASP | 2.000 | 1.8061 | 40.734 |
| 24 | −44.727 | | variable | | |
| 25 | −13.904 | | 1.000 | 1.8340 | 37.345 |
| 26 | −128.527 | | 0.100 | | |
| 27 | 23.310 | ASP | 3.031 | 1.8467 | 23.785 |
| 28 | −1000.000 | | variable | | |
| 29 | INFINITY | | 2.820 | 1.5168 | 64.198 |
| 30 | INFINITY | | 1.000 | | |
| 31 | INFINITY | | 0.500 | 1.5567 | 58.649 |
| 32 | INFINITY | | 1.000 | | |
| i | INFINITY | | | | |

In accordance with change of lens position state from the wide-angle end state up to the telescopic end state, spacing D5 between the first lens group GR1 and the second lens group GR2, spacing D14 between the second lens group GR2 and the third lens group GR3, spacing D19 between the third lens group GR3 and the fourth lens group GR4, spacing D22 between the fourth lens group GR4 and the fifth lens group GR5, spacing D24 between the fifth lens group GR5 and the sixth lens group GR6, and spacing D28 between the sixth lens group GR6 and the low-pass filter LPF. In view of the above, respective values at wide-angle end state of the respective spacings, intermediate focal length between the wide-angle end state and the telescopic end state are shown together with focal length f, F number Fno. and half picture angle ω.

TABLE 2

| f | 14.74 | 33.96 | 78.21 |
|---|---|---|---|
| Fno. | 2.87 | 4.06 | 5.04 |
| ω | 42.56 | 20.75 | 9.27 |
| D5 | 1.000 | 15.734 | 50.015 |
| D14 | 29.974 | 8.438 | 1.000 |
| D19 | 7.455 | 6.598 | 9.852 |
| D22 | 3.896 | 3.955 | 1.500 |
| D24 | 5.050 | 6.514 | 7.518 |
| D28 | 5.000 | 17.557 | 30.785 |

Respective lens plane surfaces of the sixth plane, the 15-th plane, the 16-th plane, and the 23-th plane are constituted by non-spherical surface. Non-spherical coefficients are as shown in Table 3. In this case, 'E-i' in the Table 3 and the following Tables indicating non-spherical coefficients represents exponential representation having 10 as base, i.e., '$10^{-i}$'. For example, '0.12345E−05' represents '$0.12345 \times 10^{-5}$'.

Figure 2:
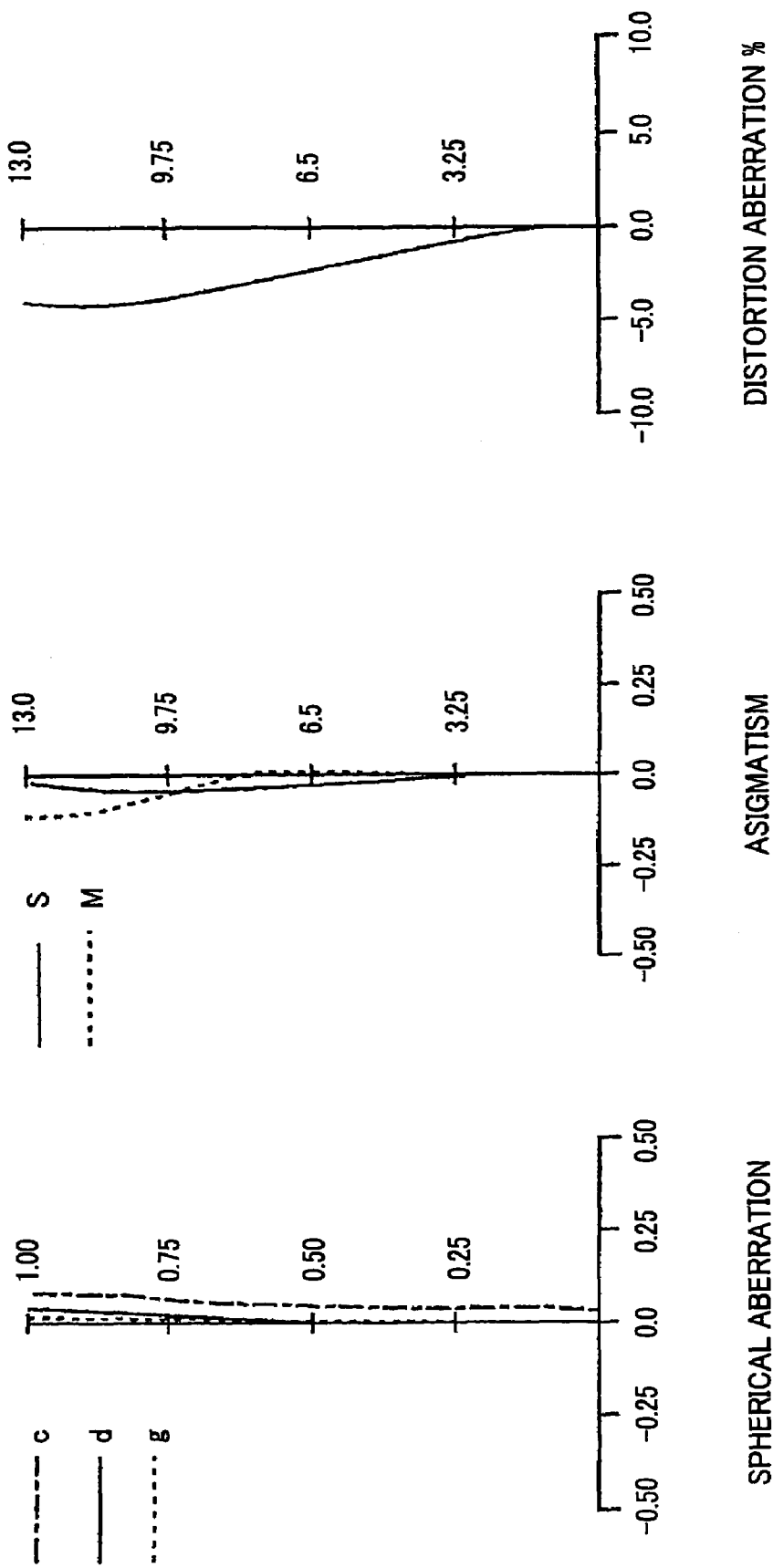
FIG. 2 shows, along with FIGS. 3 and 4, various aberration diagrams of numeric value embodiment 1 in which numerical values are applied to the first embodiment of the zoom lens system of the present invention, and this Figure shows spheri-cal aberration, astigmatism and distortion aberration at the wide-angle end state.
Figure 3:
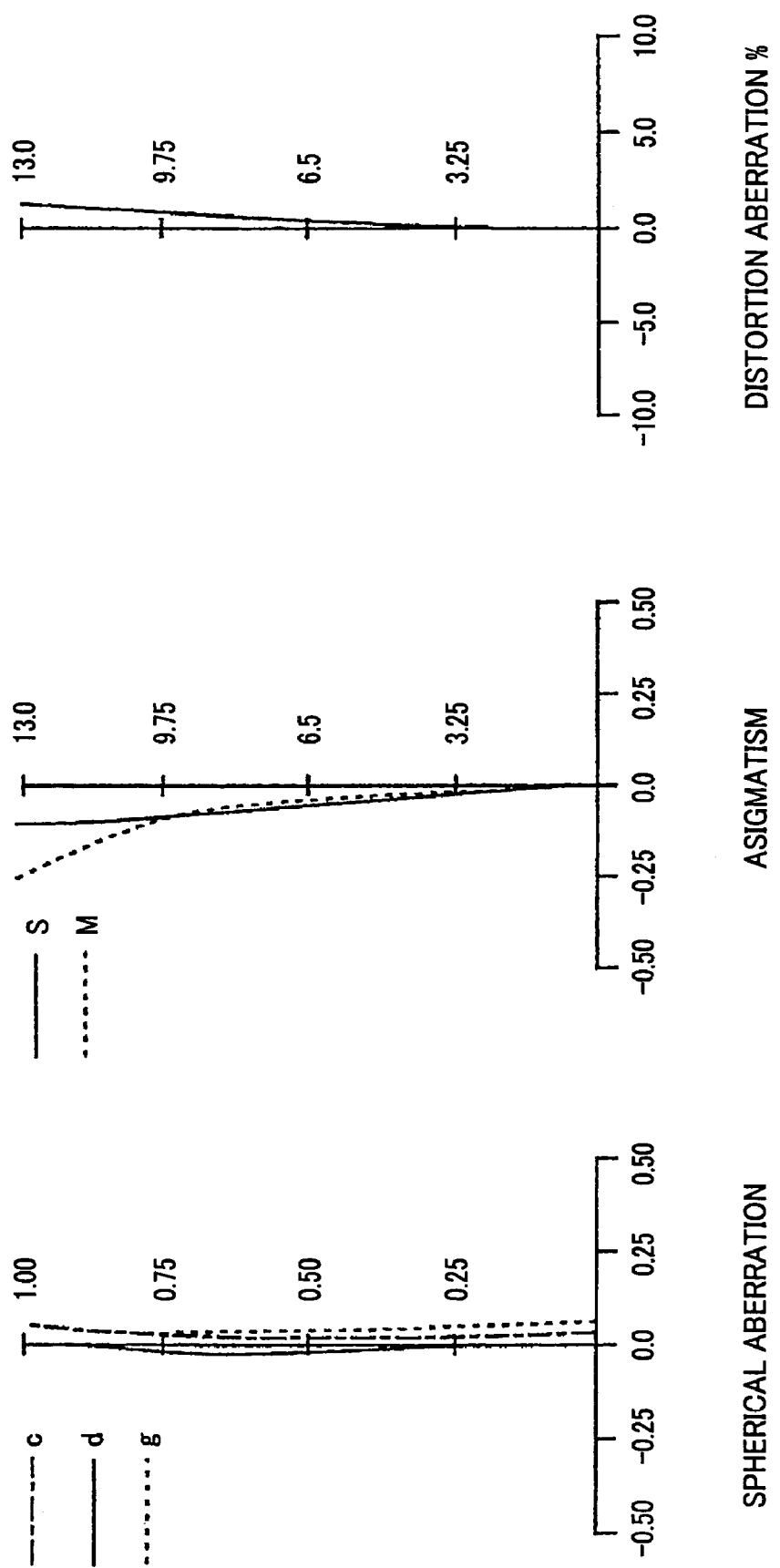
FIG. 3 shows spherical aberration, astigmatism and distor-tion aberration at the intermediate focal length.
Figure 4:
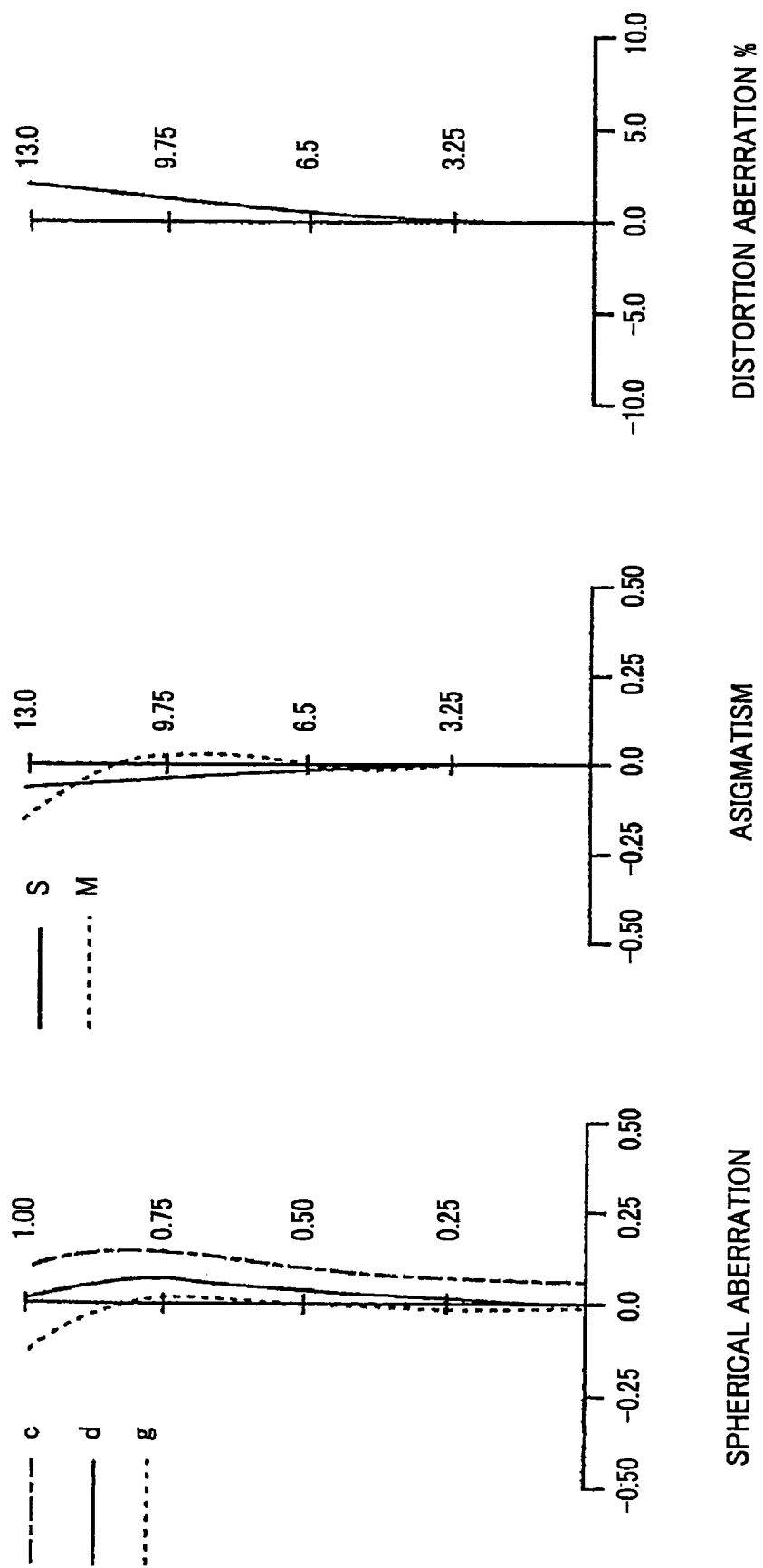
FIG. 4 shows spherical aberration, astigmatism and distor-tion aberration at the telescopic end state.

Various aberration diagrams in the infinity far in-focus state of the numeric value embodiment 1 are respectively shown in FIGS. 2 to 4. FIG. 2 shows various aberration diagrams at wide-angle end state (f=14.74). FIG. 3 shows various aberration diagrams at intermediate focal length (f=33.96) between wide-angle end state and the telescopic end state, and FIG. 4 shows various aberration diagrams at the telescopic end state (f=78.21)

In the respective aberration diagrams of FIGS. 2 to 4, in the case of the spherical aberration, ratio with respect to open F-value is taken on the ordinate and defocus is taken on the abscissa, wherein solid line indicates spherical aberration at d line, single-dotted lines indicate spherical aberration at C line, and dotted lines indicate spherical aberration at g line. In the case of astigmatism, image height is taken on the ordinate and the focus is taken on the abscissa, wherein solid line S indicates of sagittal image and dotted lines M indicates meridonal image surface. In the case of distortion aberration, the ordinate indicates image height and the abscissa indicates %.

In the numeric value embodiment 1, as shown in the tables 10 and 11 which will be described later, the conditional formulas (1) to (9) are satisfied. Moreover, as shown in the respective aberration diagrams, respective aberrations are all corrected in well-balanced manner at the wide-angle end state, intermediate focal length between wide-angle end state and telescopic end state, and the telescopic end state.

Figure 5:
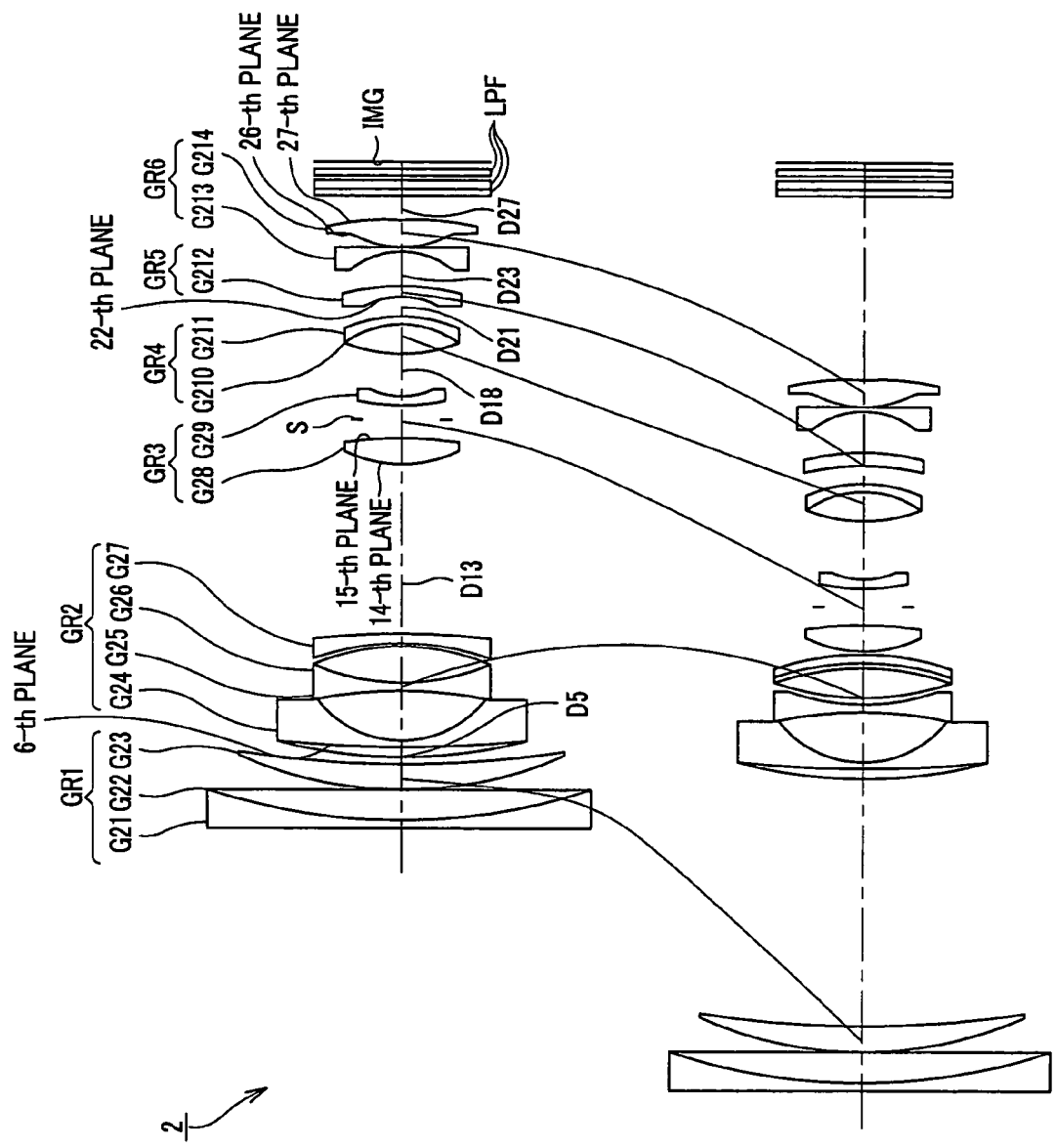
FIG. 5 is a view showing lens configuration of a second embodiment of the zoom lens system of the present invention.

FIG. 5 shows the lens configuration according to the second embodiment 2 of the zoom lens system of the present invention. A first lens group GR1 having positive refractive power, a second lens group GR2 having negative refractive power, a third lens group GR3 having positive refractive power, a fourth lens group GR4 having positive refractive power, a fifth lens group GR5 having positive refractive power, and a sixth lens group GR6 having negative refractive power are arranged in order from the object side. In magnification changing or adjusting operation from the wide-angle end state up to the telescopic end state, the respective lens groups are moved on the optical axis, as indicated by solid line, from the state shown at the upper row of FIG. 5 up to the state shown at the lower row.

The first lens group GR1 is composed of a connection lens of a negative lens G21 and a positive lens G22, and a positive lens which are arranged in order from the object side. The second lens group GR2 is composed of a negative lens G24 having composite non-spherical surface at the object side, a connection lens of a negative lens G25 and a positive lens G26, and a negative lens G27. The third lens group GR3 is composed of a positive lens G28 having non-spherical surfaces at both surfaces thereof, an iris S and a negative lens G29 which are arranged in order from the object side. The fourth lens group GR4 is comprised of a connection lens of a positive lens S210 and a negative lens G211. The fifth lens group GR5 is comprised of a negative lens G212 having non-spherical surface at the object side. The sixth lens group

TABLE 3

| PLANE No. | K | $A^4$ | $A^6$ | $A^8$ | $A^{10}$ |
|---|---|---|---|---|---|
| 6 | 0.000E+00 | 1.492E−05 | −2.805E−08 | 4.172E−11 | −3.731E−14 |
| 15 | 0.000E+00 | −2.686E−05 | −4.953E−08 | 2.916E−10 | −8.762E−13 |
| 16 | 0.000E+00 | 1.538E−05 | −2.549E−08 | 2.661E−10 | 0.000E+00 |
| 23 | 0.000E+00 | 7.124E−05 | −2.204E−07 | 1.241E−09 | 4.679E−13 |
| 27 | 0.000E+00 | −9.611E−05 | 5.149E−07 | −2.641E−09 | 6.244E−12 |

GR6 is composed of a negative lens G213, and a positive lens G214 having non-spherical surfaces at both surface sides thereof which are arranged in order from the object side.

Values of various elements of numeric value embodiment 2 in which practical numeric values are applied to the second embodiment is shown in Table 4.

TABLE 4

| PLANE NO. | R | D | Nd | Vd |
|---|---|---|---|---|
| 1 | 500.000 | | 1.700 | 1.8467 | 23.785 |
| 2 | 89.433 | | 4.558 | 1.7292 | 54.674 |
| 3 | 30368.607 | | 0.200 | | |
| 4 | 63.257 | | 4.175 | 1.8350 | 42.984 |
| 5 | 236.092 | | variable | | |
| 6 | −893.766 | ASP | 0.200 | 1.5361 | 41.207 |
| 7 | 165.419 | | 1.500 | 1.8350 | 42.984 |
| 8 | 16.144 | | 7.827 | | |
| 9 | −66.815 | | 1.100 | 1.8350 | 42.984 |
| 10 | 31.665 | | 5.303 | 1.8467 | 23.785 |
| 11 | −41.056 | | 1.173 | | |
| 12 | −30.000 | | 1.100 | 1.8350 | 42.984 |
| 13 | −67.131 | | variable | | |
| 14 | 16.904 | ASP | 3.476 | 1.6180 | 63.396 |
| 15 | −42.387 | ASP | 2.500 | | |
| IRIS | INFINITY | | 3.000 | | |
| 17 | 30.101 | | 0.900 | 1.9229 | 20.880 |
| 18 | 15.438 | | variable | | |
| 19 | 24.046 | | 4.988 | 1.4970 | 81.608 |

TABLE 4-continued

| PLANE NO. | R | D | Nd | Vd |
|---|---|---|---|---|
| 20 | −12.476 | | 0.900 | 1.8350 | 42.984 |
| 21 | −19.662 | | variable | | |
| 22 | −18.069 | ASP | 1.600 | 1.8061 | 40.734 |
| 23 | −24.363 | | variable | | |
| 24 | −11.833 | | 1.000 | 1.7292 | 54.674 |
| 25 | −343.116 | | 0.200 | | |
| 26 | 20.764 | ASP | 3.700 | 1.5831 | 59.461 |
| 27 | −120.143 | ASP | variable | | |
| 28 | INFINITY | | 2.820 | 1.5168 | 64.198 |
| 29 | INFINITY | | 1.000 | | |
| 30 | INFINITY | | 0.500 | 1.5567 | 58.649 |
| 31 | INFINITY | | 1.000 | | |
| IMG | INFINITY | | | | |

In accordance with change of the lens position state from the wide-angle end state up to the telescopic end state, spacing D5 between the first lens group GR1 and the second lens group GR2, spacing D13 between the second lens group GR2 and the third lens group GR3, spacing D18 between the third lens group GR3 and the fourth lens group GR4, spacing D21 between the fourth lens group GR4 and the fifth lens group GR5, spacing D23 between the fifth lens group GR5 and the sixth lens group GR6, and spacing between the sixth lens group GR6 and the low-pass filter LPF are changed. In view of the above, various values at wide-angle end state of the respective spacings, the intermediate focal distance between the wide-angle end state and the telescopic end state, and the telescopic end state are shown in Table 5 together with focal length, F number Fno. and half picture angle ω.

TABLE 5

| | | | |
|---|---|---|---|
| f | 14.73 | 33.94 | 78.21 |
| Fno. | 2.887 | 4.214 | 4.965 |
| ω | 42.51 | 21.12 | 9.27 |
| D5 | 1.000 | 8.134 | 39.832 |
| D13 | 27.079 | 15.812 | 1.000 |
| D18 | 6.737 | 5.767 | 8.220 |
| D21 | 2.984 | 3.953 | 1.500 |
| D23 | 5.211 | 7.054 | 8.548 |
| D27 | 5.257 | 18.692 | 29.167 |

Respective lens plane surfaces of the sixth plane, the 14-th plane, the 15-th plane, the 22-th plane, the 26-th plane and the 27-th plane are constituted by non-spherical surfaces. Non-spherical coefficients are shown in the Table 6.

TABLE 6

| PLANE NO. | K | $A^4$ | $A^6$ | $A^8$ | $A^{10}$ |
|---|---|---|---|---|---|
| 6 | 0.000E+00 | 1.827E−05 | −3.819E−08 | 5.782E−11 | −5.154E−14 |
| 14 | 0.000E+00 | −3.253E−05 | −3.767E−08 | 3.484E−10 | −7.491E−12 |
| 15 | 0.000E+00 | 1.411E−05 | 2.309E−08 | −5.174E−10 | 0.000E+00 |
| 22 | 0.000E+00 | 1.125E−04 | −4.595E−07 | 2.679E−09 | 7.513E−14 |
| 26 | 0.000E+00 | −1.580E−04 | 6.546E−07 | −4.596E−09 | 1.213E−11 |
| 27 | 0.000E+00 | −2.899E−05 | −2.000E−07 | 0.000E+00 | 0.000E+00 |

Figure 6:
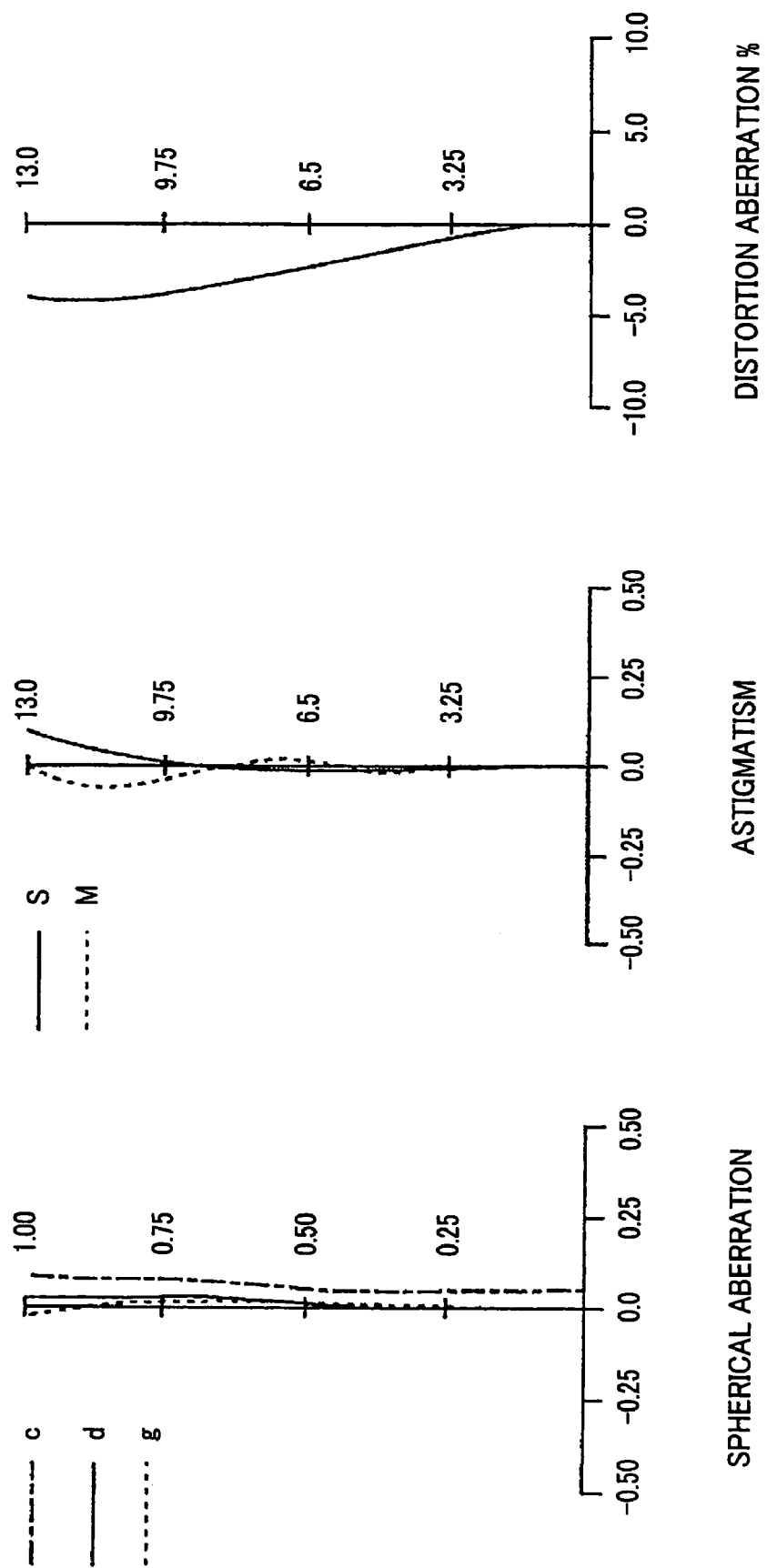
FIG. 6 shows, together with FIGS. 7 and 8, various aber-ration diagrams of numeric value embodiment 2 in which practical numerical values are applied to the second embodi-ment of the zoom lens system of the present invention, and this Figure shows spherical aberration, astigmatism, and dis-tortion aberration at the wide-angle end state.
Figure 7:
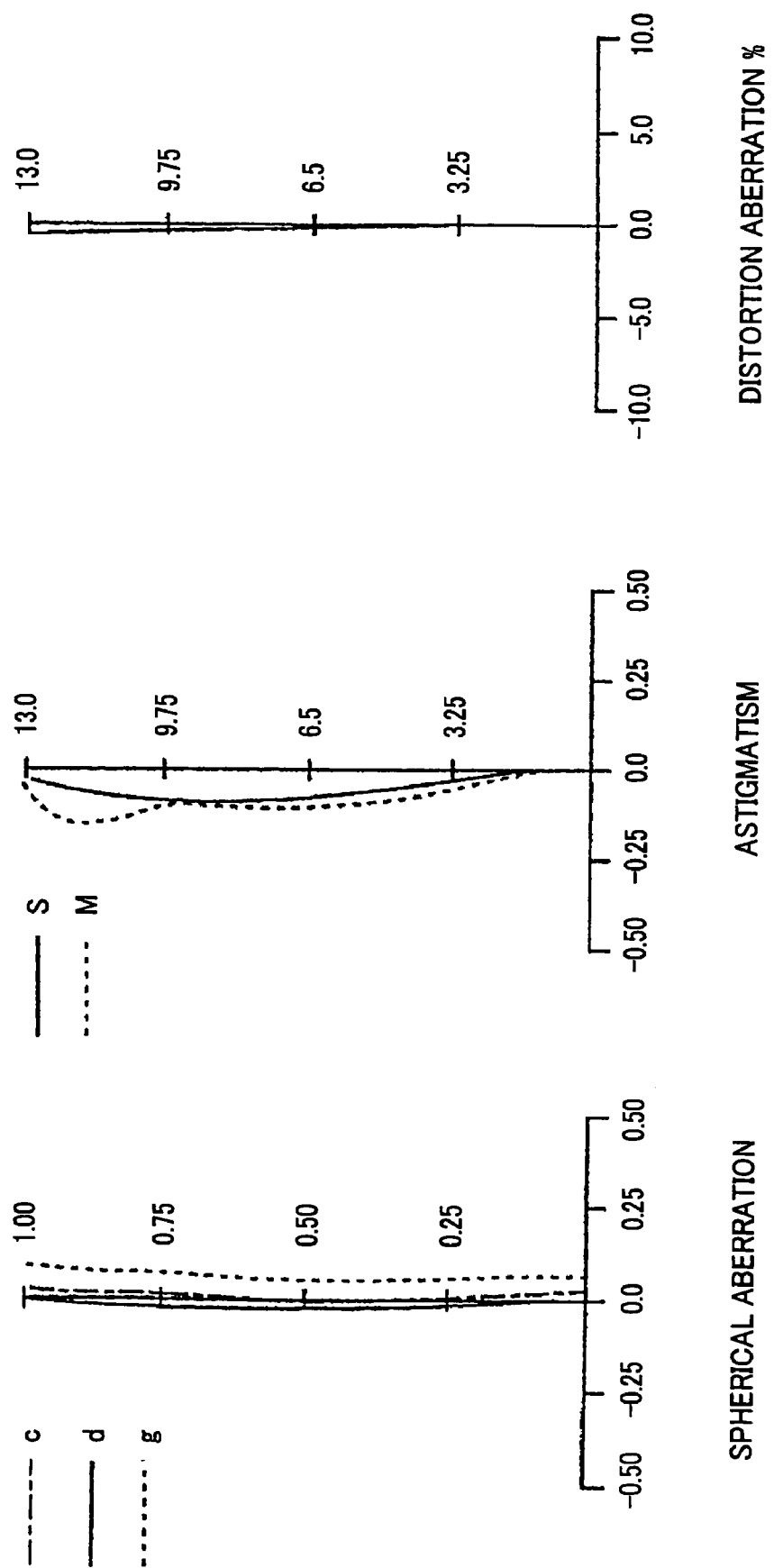
FIG. 7 shows spherical aberration, astigmatism and distor-tion aberration at the immediate focal length.
Figure 8:
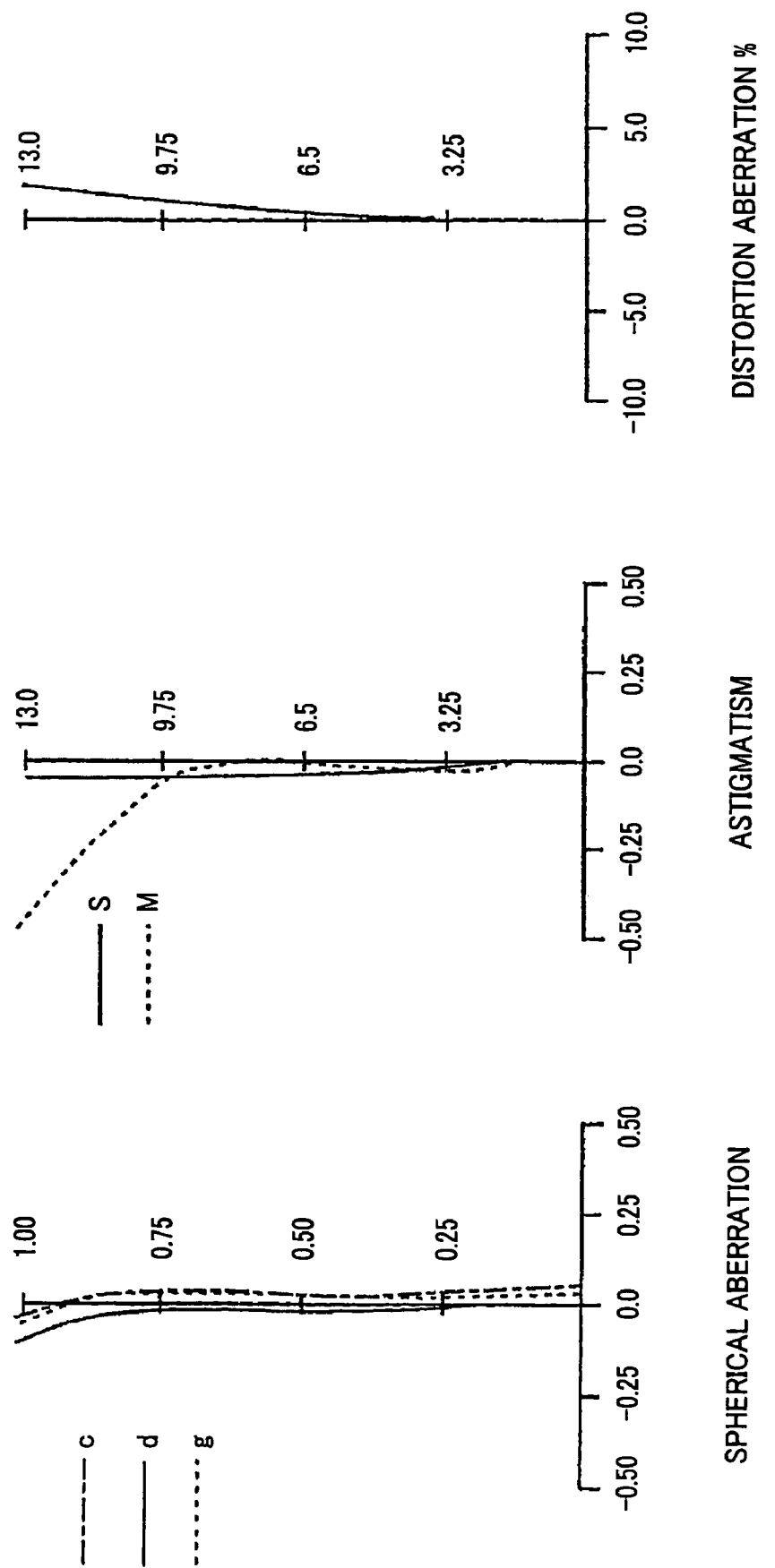
FIG. 8 shows spherical aberration, astigmatism and distor-tion aberration at the telescopic end state.

Various aberration diagrams in the infinity far in-focus state of the numeric value embodiment 2 are respectively shown in FIGS. 6 to 8. FIG. 6 shows various aberration diagrams at the wide-angle end state (f=14.73), FIG. 7 shows various aberration diagrams at intermediate focal length (f=33.94) between the wide-angle end state and the telescopic end state, and FIG. 8 shows various aberration diagrams at the telescopic end state (f=78.21).

In the respective aberration diagrams of FIGS. 6 to 8, in the case of the spherical aberration, the ordinate indicates ratio with respect to open F-value, the abscissa indicates defocus, solid line indicates spherical aberration at d-line, single dotted lines indicate spherical aberration at C line, and dotted lines indicate spherical aberration at g-line. In the case of astigmatism, the ordinate indicates image height, the abscissa indicates focus, solid line S indicate sagittal image surface, and dotted lines M indicates meridional image surface. In the case of distortion aberration, the ordinate indicates image height and the abscissa indicates %.

In the numeric value embodiment 2, as shown in the Tables 10 and 11 which will be described later, the conditional formulas (1) to (9) are satisfied. Moreover, as shown in the respective aberration diagrams, respective aberrations are all corrected in well-balanced manner at the wide-angle end state, the intermediate focal length between the wide-angle end state and the telescopic end state, and the telescopic end state.

Figure 9:
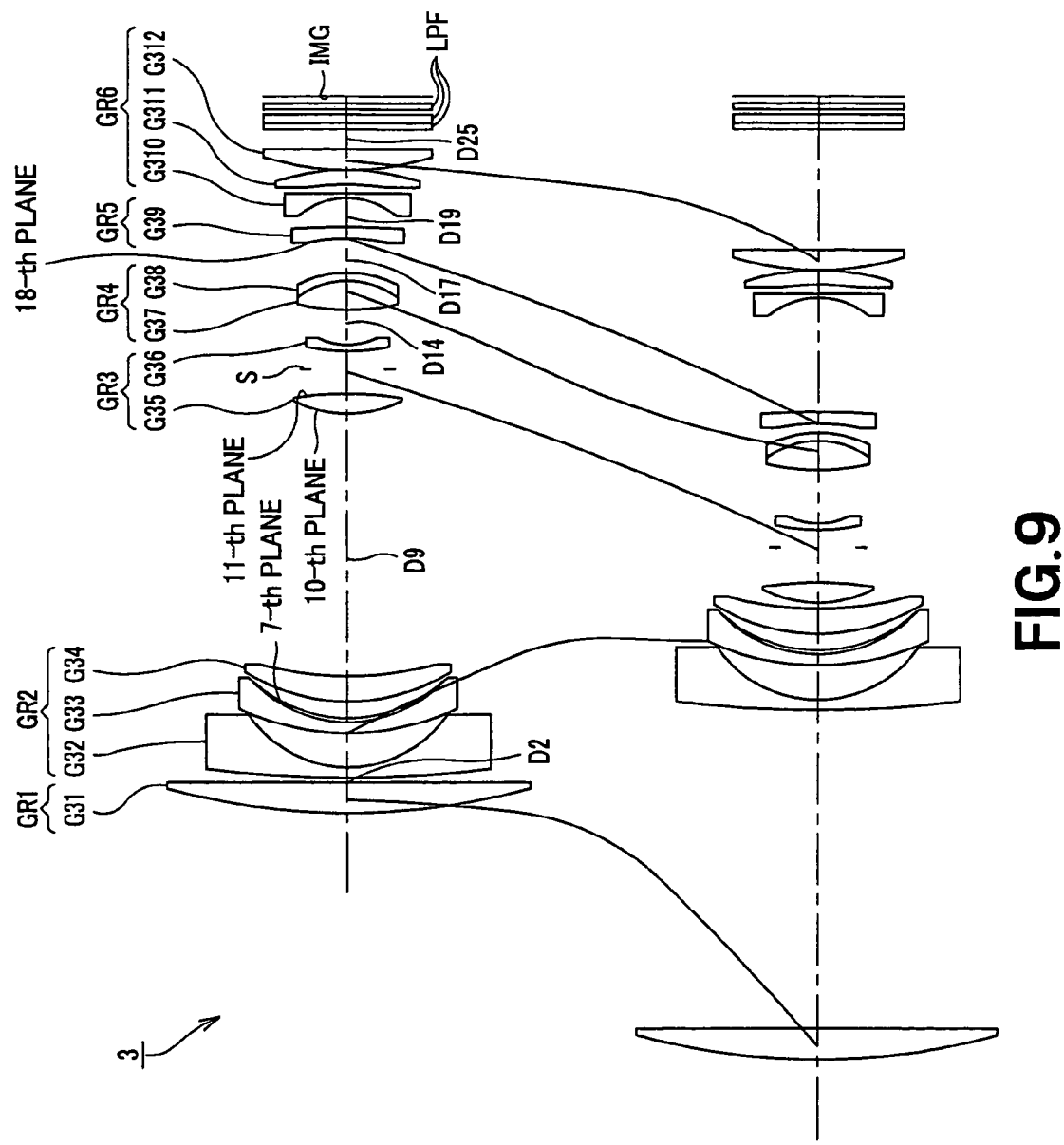
FIG. 9 is a view showing lens configuration of a third embodiment of the zoom lens system of the present invention.

FIG. 9 shows the lens configuration according to the third embodiment 3 of the zoom lens system of the present invention. A first lens group GR1 having positive refractive force, a second lens group GR2 having negative refractive force, a third lens group GR3 having positive refractive force, a fourth lens group GR4 having positive refractive force, a fifth lens group GR5 having positive refractive force, and a sixth lens group GR6 having negative refractive power are arranged in order from the object side. In magnification changing or adjusting operation from the wide-angle end state up to the telescopic end state, the respective lens groups are moved, as indicated by solid line, from the state shown at the upper row of FIG. 9 up to the state shown at the lower row.

The first lens group GR1 is comprised of a positive lens G31. The second lens group GR2 is composed of a negative lens G32, a negative lens G33 having composite non-spherical surface at the image side, and a positive lens G34 which are arranged in order from the object side. The third lens group GR3 is composed of a positive lens G35 having non-spherical surfaces at both surface sides, an iris S, and a negative lens G36 which are arranged in order from the object side. The fourth lens group GR4 is comprised of a connection lens of a positive lens G37 and a negative lens G38. The fifth lens group GR5 is comprised of a negative lens G39 having non-spherical surface at the object side. The sixth lens group GR6 is composed of a negative lens G310, a positive lens G311 and a positive lens G312 which are arranged in order from the object side.

Values of various elements of the numeric embodiment 3 in which practical numeric values are applied to the third embodiment are shown in Table 7.

TABLE 7

| PLANE NO. | R | D | Nd | Vd |
|---|---|---|---|---|
| 1 | 74.828 | 6.000 | 1.4875 | 70.441 |
| 2 | 2323.689 | variable | | |
| 3 | 194.721 | 1.200 | 1.8350 | 42.984 |
| 4 | 18.739 | 6.801 | | |
| 5 | 69.005 | 1.300 | 1.8350 | 42.984 |
| 6 | 28.020 | 0.200 | 1.5361 | 41.207 |
| 7 | 21.464 ASP | 3.464 | | |
| 8 | 39.064 | 3.427 | 1.9229 | 20.880 |
| 9 | 167.403 | variable | | |
| 10 | 16.232 ASP | 4.078 | 1.5831 | 59.461 |
| 11 | −70.493 ASP | 3.427 | | |
| IRIS | INFINITY | 3.000 | | |
| 13 | 27.824 | 0.900 | 1.9229 | 20.880 |
| 14 | 14.769 | variable | | |
| 15 | 25.530 | 4.800 | 1.4875 | 70.441 |
| 16 | −11.175 | 0.900 | 1.8042 | 46.503 |
| 17 | −18.168 | variable | | |
| 18 | −43.645 ASP | 1.600 | 1.5831 | 59.461 |
| 19 | −100.000 | variable | | |
| 20 | −13.656 | 1.000 | 1.8061 | 33.269 |

TABLE 7-continued

| PLANE NO. | R | D | Nd | Vd |
|---|---|---|---|---|
| 21 | 99.385 | 1.011 | | |
| 22 | −166.154 | 2.977 | 1.7020 | 40.196 |
| 23 | −26.038 | 0.200 | | |
| 24 | −46.145 | 3.229 | 1.9229 | 20.880 |
| 25 | −144.316 | variable | | |
| 26 | INFINITY | 2.820 | 1.5168 | 64.198 |
| 27 | INFINITY | 1.000 | | |
| 28 | INFINITY | 0.500 | 1.5567 | 58.649 |
| 29 | INFINITY | 1.000 | | |
| IMG | INFINITY | | | |

In accordance with change of lens position state from the wide-angle end state up to the telescopic end state, a spacing D2 between first lens group GR1 and second lens group GR2, a spacing D9 between second lens group GR2 and third lens group GR3, a spacing D14 between third lens group GR3 and fourth lens group GR4, a spacing D17 between fourth lens group GR4 and fifth lens group GR5, a spacing D19 between the fifth lens group GR5 and sixth lens group GR6, and a spacing D25 between the sixth lens group GR6 and low-pass filter LPF are changed. In view of the above, respective values at wide-angle end state of the respective spacings, the intermediate focal length between the wide-angle end state and the telescopic end state, and the telescopic end state are shown together with focal length f, Fnumber Fno. and half picture angle ω.

TABLE 8

| f | 14.73 | 32.05 | 69.72 |
|---|---|---|---|
| Fno. | 2.879 | 3.694 | 1.726 |
| ω | 42.581 | 21.778 | 10.471 |
| D2 | 1.000 | 22.453 | 52.494 |
| D9 | 42.096 | 14.570 | 1.000 |
| D14 | 5.133 | 5.911 | 8.837 |
| D17 | 5.203 | 4.425 | 1.500 |
| D19 | 4.232 | 8.584 | 16.240 |
| D25 | 2.500 | 9.801 | 20.093 |

Respective lens plane surfaces of the 7-th plane, the 10-th plane, the 11 th plane and the 18-th plane are constituted by non-spherical surface. Non-spherical coefficients are shown in Table 9.

TABLE 9

| PLANE NO. | K | $A^4$ | $A^6$ | $A^8$ | $A^{10}$ |
|---|---|---|---|---|---|
| 7 | 0.000E+00 | −2.498E−05 | −3.086E−08 | 9.062E−12 | −2.731E−13 |
| 10 | 0.000E+00 | −2.348E−05 | −1.374E−08 | −3.312E−10 | 1.602E−12 |
| 11 | 0.000E+00 | 1.348E−05 | 8.672E−09 | −3.344E−11 | 0.000E+00 |
| 18 | 0.000E+00 | 2.372E−05 | −4.285E−09 | 2.092E−09 | −1.192E−11 |

Figure 10:
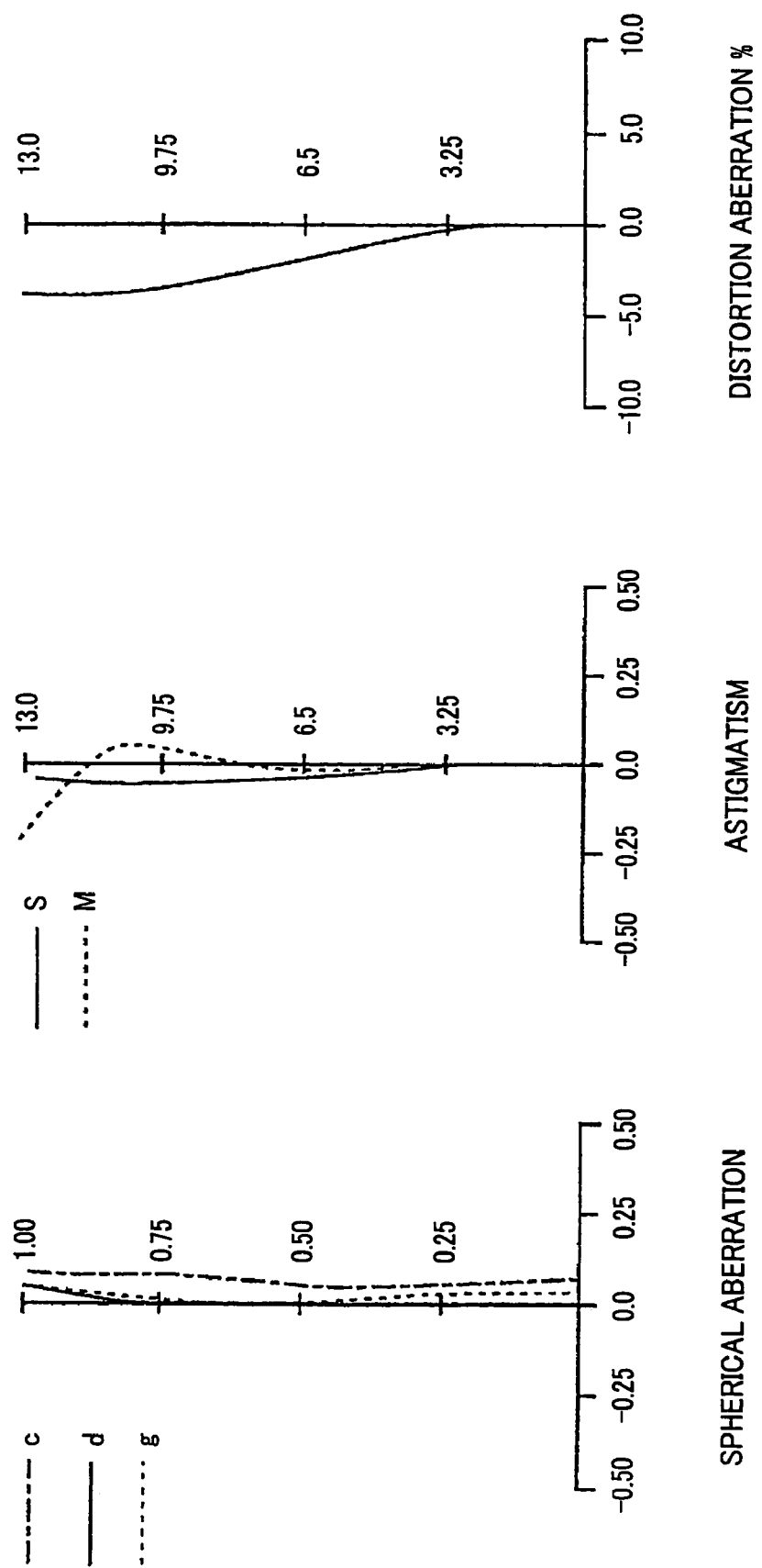
FIG. 10 shows, together with FIGS. 11 and 12, various aberration diagrams of numeric value embodiment 3 in which practical numeric values are applied to the third embodiment of the zoom lens system of the present invention, and this Figure shows spherical aberration, astigmatism and distor-tion aberration at the wide-angle end state.
Figure 11:
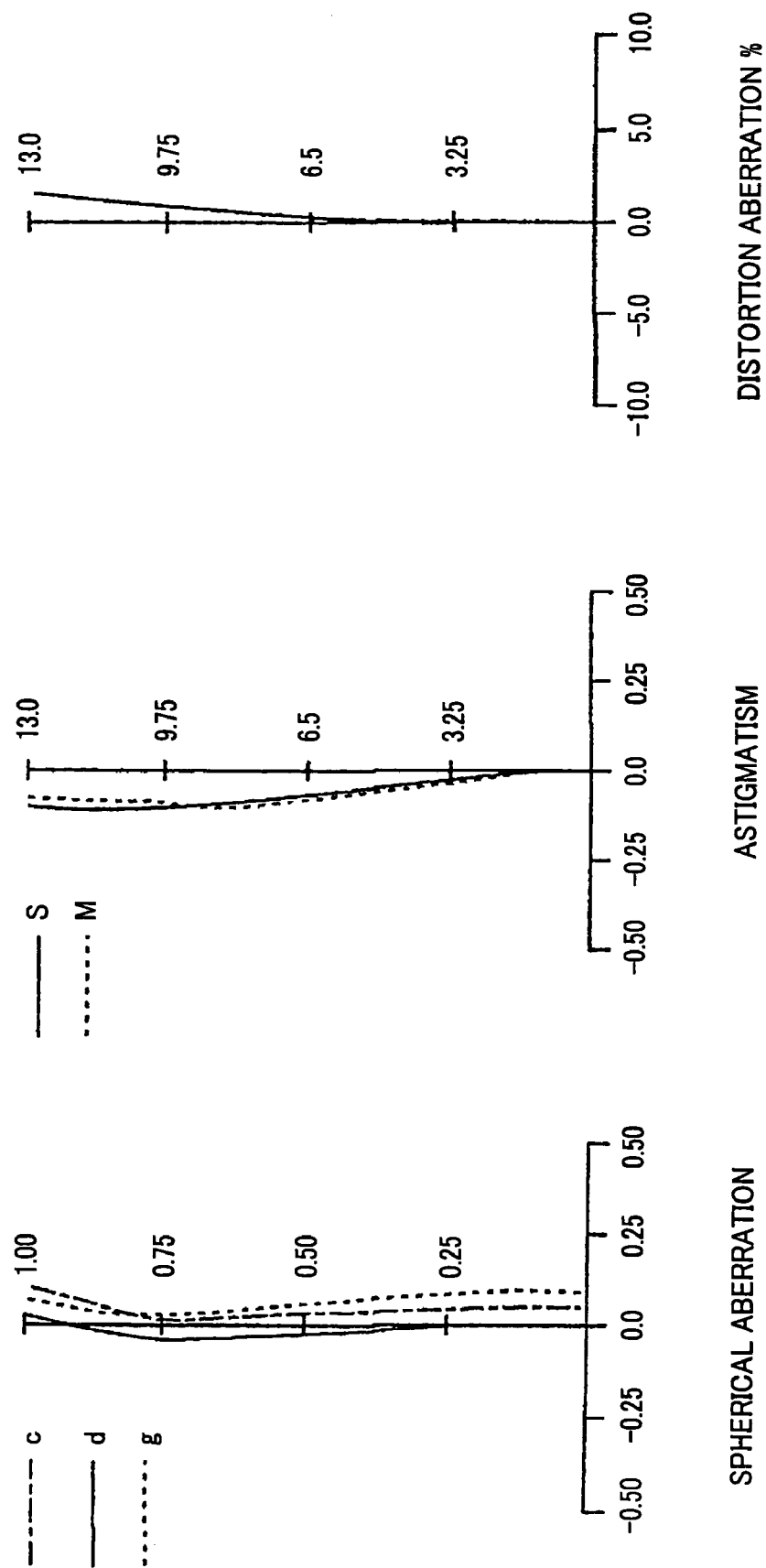
FIG. 11 shows spherical aberration, astigmatism and dis-tortion aberration at the intermediate focal length.
Figure 12:
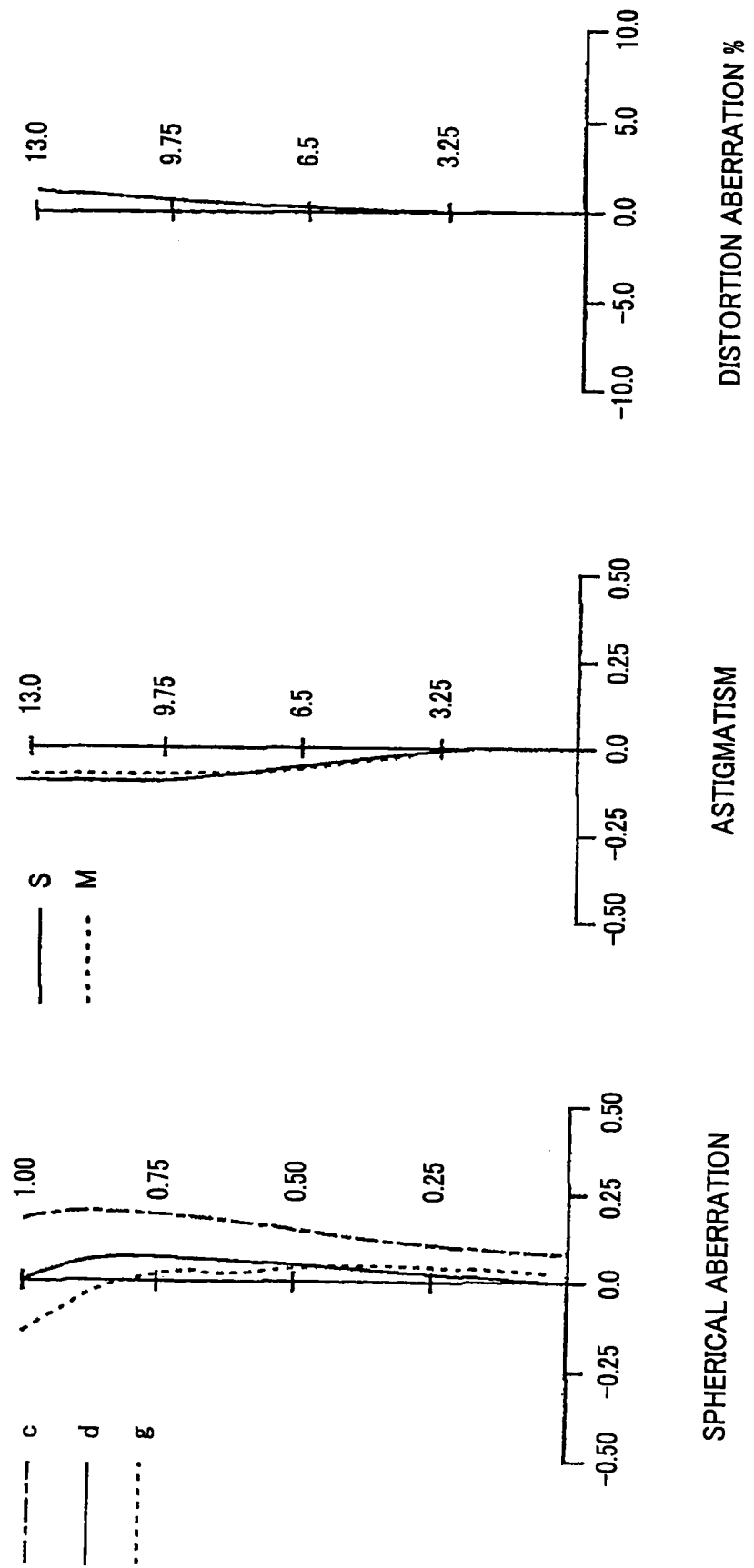
FIG. 12 shows spherical aberration, astigmatism and dis-tortion aberration at the telescopic end state.

Various aberration diagrams in the infinity far in-focus state of the numeric value embodiment 3 are respectively shown in FIGS. 10 to 12. FIG. 10 shows various aberration diagrams at wide-angle end state (f=14.73), FIG. 11 shows various aberration diagrams at the intermediate focal length (f=32.05) between the wide-angle end state and the telescopic end state. FIG. 12 shows various aberration diagrams at the telescopic end state (f=69.72).

In the respective aberration diagrams of FIGS. 10 to 12, in the case of the spherical aberration, ratio with respect to open F value is taken on the ordinate and defocus is taken on the abscissa, wherein solid line indicates spherical aberration at d line, single dotted lines indicate spherical aberration at C line, and dotted lines indicate spherical aberration at g line. In the case of astigmatism, the ordinate indicates image height, the abscissa indicates focus, solid line S indicates sagittal image surface, and dotted lines M indicates meridional image surface. In the case of distortion aberration, the ordinate indicates image height, and the abscissa indicates %.

In the numeric value embodiment 3, as shown in the Tables 10 and 11 which will be described later, the conditional formulas (1) to (9) are satisfied. Moreover, as shown in the respective aberration diagrams, respective aberrations are all corrected in a well-balanced manner at the wide-angle end state, the intermediate focal length between the wide-angle end state and telescopic end state, and the telescopic end state.

Values corresponding to the conditional formulas (1) to (5) of the respective numeric value embodiments 1 to 3 are shown in Table 10. Moreover, values corresponding to the conditional formulas (6) to (9) are shown in Table 11.

TABLE 10

| Numeric Value Embodiment | | |
| --- | --- | --- |
| Formula (1) | DW (1-2) | DT (1-2) |
| 1 | 1.000 | 52.494 |
| 2 | 1.000 | 39.832 |
| 3 | 1.000 | 52.494 |
| Formula (2) | DW (2-3) | DT (2-3) |
| 1 | 42.096 | 1.000 |
| 2 | 27.079 | 1.000 |
| 3 | 42.096 | 1.000 |
| Formula (3) | DW (3-4) | DT (3-4) |
| 1 | 6.955 | 9.352 |
| 2 | 6.737 | 8.220 |
| 3 | 5.133 | 8.837 |
| Formula (4) | DW (4-5) | DT (4-5) |
| 1 | 3.896 | 1.500 |
| 2 | 2.984 | 1.500 |
| 3 | 5.203 | 1.500 |
| Formula (5) | DW (5-6) | DT (5-6) |
| 1 | 4.050 | 6.518 |
| 2 | 4.211 | 7.548 |
| 3 | 3.536 | 15.543 |

TABLE 11

| Numeric Value Embodiment | Formula (6) fw/fg5 | Formula (7) Twbf/fw | Formula (8) $\beta tg6$ | Formula (9) $\beta wg6$ |
| --- | --- | --- | --- | --- |
| 1 | −0.0718 | 0.622 | 1.578 | 1.198 |
| 2 | −0.1513 | 0.955 | 1.408 | 1.174 |
| 3 | −0.1102 | 0.693 | 1.408 | 1.300 |

It is to be noted that while respective lens groups of zoom lenses shown in the respective embodiments are constituted only by refraction type lens for deflecting rays of incident light by refraction (i.e., lens of the type in which deflection is performed at the interface or surface between media having different refractive indices), respective lens groups may be constituted, without being limited to the above-mentioned implementation, by, e.g., diffraction type lens for deflecting rays of incident light by refraction, refraction diffraction hybrid type lens for deflecting rays of incident light by combination of diffracting action and refracting action, and/or refractive index distribution type lens for deflecting rays of incident light by refractive index distribution within medium, etc.

Moreover, plane having no optical power (e.g., refraction plane surface, refraction plane surface, diffraction plane surface) may be provided to bend or fold the optical path before and after the zoom lens system or in the middle thereof. Bending position may be set as occasion demands. By suitable bending of optical path, it is possible to attain realization of superficial thin structure of camera.

Moreover, one or plural lens groups, or a portion of one lens group may be shifted in a direction substantially perpendicular to the optical axis among the lens group constituting the lens system to thereby have ability to shift image. A detection system for detecting vibration or movement of the camera, a drive system for shifting the lens group, and a control system for giving shift quantity to the drive system in accordance with output of the detection system may be combined to thereby have ability to allow such combined system to function as a vibration proof optical system.

Particularly, in the present invention, a portion of the third, the fourth and the fifth lens groups, or the entirety thereof are shifted in a direction substantially perpendicular to the optical axis, thereby making it possible to shift image by small aberration change. This is because since the third lens group is disposed in the vicinity of aperture iris, rays of abaxial light flux are passed through the portion in the vicinity of the optical axis so that there is small change of comatic aberration taking place in performing shift operation.

Figure 13:
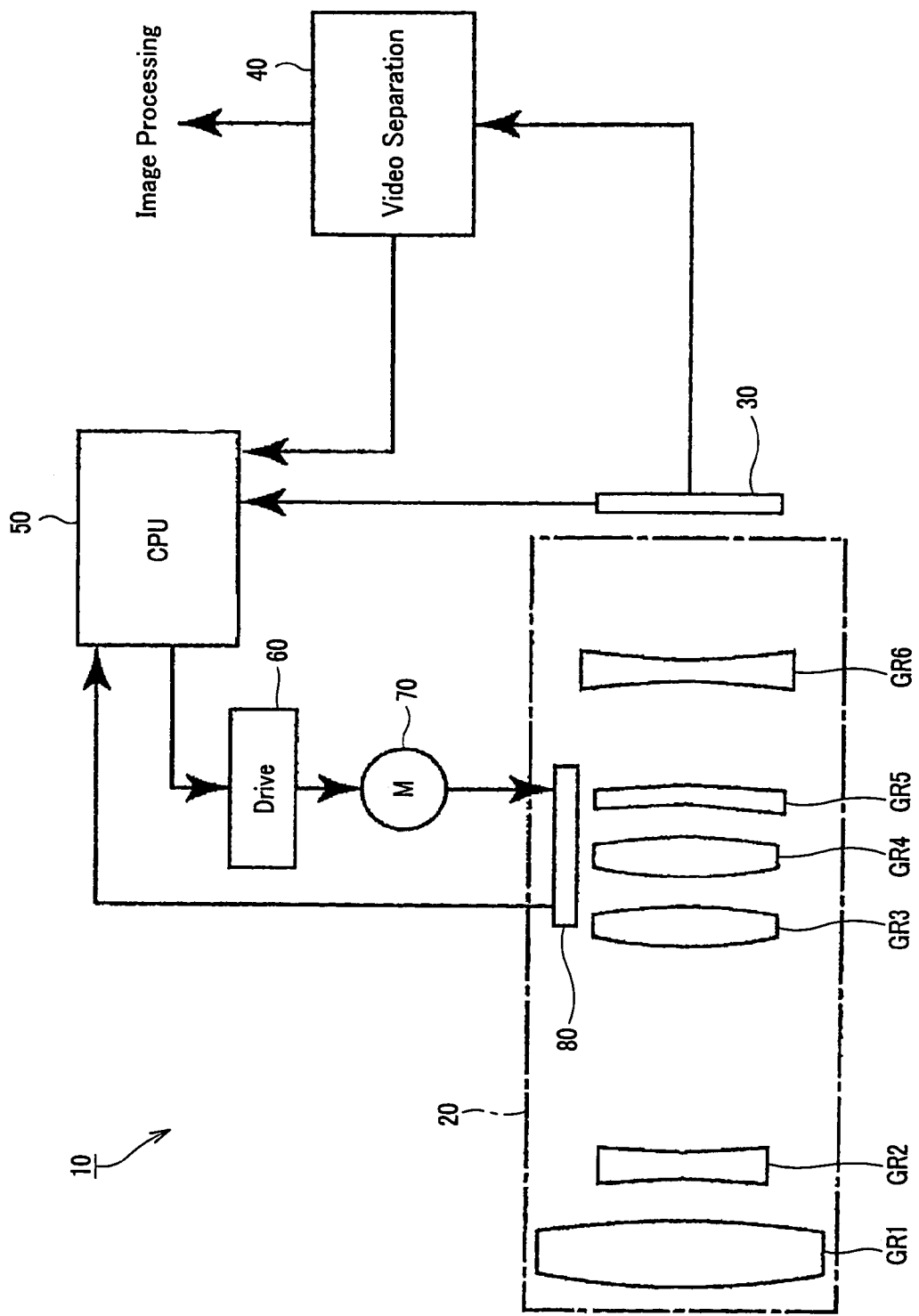
FIG. 13 is a block diagram showing an embodiment of an image pick-up apparatus of the present invention.

The embodiment of the image pick-up apparatus of the present invention is shown in FIG. 13.

The image pick-up apparatus 10 comprises a zoom lens 20, and includes an image pick-up device 30 for converting an optical image formed by the zoom lens 20 into an electric signal. In this example, as the image pick-up device 30, there can be applied devices using, e.g., CCD (Charge Coupled Device) or CMOS (Complementary Metal-Oxide Semiconductor), etc. The zoom lens system according to the present invention can be applied to the zoom lens 20. In FIG. 13, respective lens groups of the zoom lens 1 according to the first embodiment shown in FIG. 1 are illustrated as single lens in a simplified manner. It is a matter of course that not only the zoom lens according to the first embodiment, but also the zoom lenses according to the second and third embodiments and/or the zoom lens system of the present invention constituted by the embodiments except for the embodiments shown in this specification may be used.

An electric signal formed by the image pick-up device 30 is separated by a video separation circuit 40. Thus, a focus control signal is sent to a control circuit 50, and a video signal is sent to a video processing circuit. The signal which has been sent to the video processing circuit is processed so as to take a form suitable for processing subsequent thereto. The processed signal thus obtained is caused to undergo various processing such as display by display unit, recording onto recording medium and/or transfer by communication means, etc.

The control circuit 50 is supplied with an operation signal from the external, e.g., operation element for focus ring or focus switch, etc. so that various processing are performed in accordance with the operation signal. For example, when focus command by focus switch is inputted, a drive unit 70 is caused to become operative through a driver circuit 60 in order that there results focal length state based on the command to move the fourth lens group GR4 so that it is located at a predetermined position. Position information of the fourth lens group GR4 which have been obtained by respective sensors 80 are inputted to the control circuit 50. The position information thus inputted are referred in outputting a command signal to the driver circuit 60. Moreover, at the time of AF operation, the control circuit 50 serves to check focus state on the basis of a signal sent from the video separation circuit 40 to control, e.g., the fourth lens group GR4 through the driver circuit so that optimum focus state can be obtained.

The above-mentioned image pick-up apparatus 10 may take various forms as practical products. For example, the image pick-up apparatus 10 can be widely applied as camera unit, etc. of digital input/output equipment such as digital still camera, digital video camera, mobile telephone in which camera is assembled or incorporated and/or PDA (Personal Digital Assistant) in which camera is assembled or incorporated, etc.

It is to be noted that while the present invention has been described in accordance with preferred embodiments thereof illustrated in the accompanying drawings and described in detail, it should be understood by those ordinarily skilled in the art that the invention is not limited to embodiments, but various modifications, alternative constructions or equivalents can be implemented without departing from the scope and spirit of the present invention as set forth by the appended claims.

INDUSTRIAL APPLICABILITY

It is possible to provide zoom lens system which is compact and light in weight, and is suitable for high speed AF operation while covering the range from the broad angle side up to the telescopic side and has high image formation performance irrespective of photographing distance, and image pick-up apparatus using such zoom lens system. The zoom lens system and the image pick-up apparatus using such zoom lens system can be widely utilized for digital video camera and/or digital still camera, etc.

The invention claimed is:

1. A zoom lens system at least including a first lens group GR1 having positive refractive power, a second lens group GR2 having negative refractive power, a third lens group GR3 having positive refractive power, a fourth lens group GR4 having positive refractive power, a fifth lens group GR5 having weak refractive power (including refractive power=0), and a sixth lens group GR6 having negative refractive power which are arranged in order from the object side, thus to change spacing or spacings between the respective lens groups to thereby perform magnification changing or adjusting operation, wherein when group spacing between the i-th lens group and the j-th lens group at the wide-angle end state is DW(i-j), and group spacing between the i-th lens group and the j-th lens group at the telescopic end state is DT(i-j), the following conditional formulas (1), (2) and (3) are satisfied, $$DW(1\text{-}2) < DT(1\text{-}2) \tag{1}$$

$$DW(2\text{-}3) > DT(2\text{-}3) \tag{2}$$

$$DW(5\text{-}6) > DT(5\text{-}6), \text{ and} \tag{3}$$

the fourth lens group GR4 is moved in the optical axis direction so that focusing operation is performed.

2. The zoom lens system according to claim 1, wherein, in magnification changing or adjusting operation, the third lens group GR3 and the fifth lens group GR5 are moved in one body along on the optical axis.

3. The zoom lens system according to claim 1, wherein spacing between the third lens group GR3 and the fourth lens group GR4, and spacing between the fourth lens group GR4 and the fifth lens group GR5 satisfy the following conditional formulas (4), (5)

$$DW(3\text{-}4) < DT(3\text{-}4) \tag{4}$$

$$DW(4\text{-}5) > DT(4\text{-}5). \tag{5}$$

4. The zoom lens system according to claim 1, wherein the fifth lens group GR5 is constituted by single lens having at least one non-spherical surface, and when focal length of the fifth lens group GR5 is fg5 and focal length at the wide-angle end state of the entire system is fw, the following conditional formula (6) is satisfied $$-0.4 < fw/fg5 < 0.4. \tag{6}$$

5. The zoom lens system according to claim 1, wherein when back focus (air conversion length) at the wide-angle end state is Twbf and the focal length at the wide-angle end state of the entire system is fw, the following conditional formula (7) is satisfied $$0.2 < Twbf/fw < 1.2. \tag{7}$$

6. The zoom lens system according to claim 1, wherein the sixth lens group GR6 at least includes one negative lens having negative refractive power, and one positive lens having positive refractive power which are arranged in order from the object side, and when lateral magnification at the telescopic end state of the sixth lens group GR6 is βtg6, the following conditional formula (8) is satisfied $$1.1 < \beta tg6 < 2.0. \tag{8}$$

7. The zoom lens system according to claim 6, wherein the sixth lens group GR6 at least includes one negative lens having negative refractive power and one positive lens having positive refractive power which are arranged in order from the object side, and when lateral magnification at the wide-angle end state of the sixth lens group GR6 is βwg6, the following conditional formula (9) is satisfied $$1.05 < \beta wg6 < 1.5. \tag{9}$$

8. An image pick-up apparatus comprising a zoom lens system composed of plural groups and serving to change group spacing or spacings to thereby perform magnification changing or adjusting operation, and an image pick-up device for converting an optical image formed by the zoom lens system into an electric signal, wherein the zoom lens system at least includes a first lens group GR1 having positive refractive power, a second lens group GR2 having negative refractive power, a third lens group GR3 having positive refractive power, a fourth lens group GR4 having positive refractive power, a fifth lens group GR5 having weak refractive power (including refractive power=0), and a sixth lens group GR6 having negative refractive power which are arranged in order from the object side, thus to change spacing or spacings between the respective lens groups to thereby perform magnification changing or adjusting operation, and wherein when group spacing between the i-th lens group and the j-th lens group at the wide-angle end state is DW(i-j), and group spacing between the i-th lens group and the j-th lens group at the telescopic end state is DT(i-j), the following conditional formulas (10), (11) and (12) are satisfied, $$DW(1\text{-}2) < DT(1\text{-}2) \tag{10}$$

$$DW(2\text{-}3) > DT(2\text{-}3) \tag{11}$$

$$DW(5\text{-}6) > DT(5\text{-}6), \text{ and} \tag{12}$$

the fourth lens group GR4 is moved in the optical axis direction so that focusing operation is performed.

9. The image pickup apparatus according to claim 8, wherein, in magnification changing or adjusting operation, the third lens group GR3 and the fifth lens group GR5 are moved in one body along on the optical axis.

10. The image pick-up apparatus according to claim 8, wherein spacing between the third lens group GR3 and the fourth lens group GR4, and spacing between the fourth lens group GR4 and the fifth lens group GR5 satisfy the following conditional formulas $$DW(3\text{-}4) < DT(3\text{-}4) \tag{13}$$

$$DW(4\text{-}5) > DT(4\text{-}5). \tag{14}$$

11. The image pick-up apparatus according to claim 8, wherein the fifth lens group GR5 is constituted by single lens having at least one non-spherical surface, and when focal length of the fifth lens group GR5 is fg5 and focal length at the wide-angle end state of the entire system is fw, the following conditional formula (6) is satisfied $$-0.4 < fw/fg5 < 0.4. \tag{15}$$

12. The image pick-up apparatus according to claim 8, wherein when back focus (air conversion length) at the wide-angle end state is Twbf and focal length at the wide-angle end state of the entire system is fw, the following conditional formula (16) is satisfied $$0.2 < Twbf/fw < 1.2. \tag{16}$$

13. The image pick-up apparatus according to claim 8, wherein the sixth lens group GR6 at least includes one negative lens having negative refractive power, and one positive lens having positive refractive power which are arranged in order from the object side, and when lateral magnification at the telescopic end state of the sixth lens group GR6 is $\beta tg6$, the following conditional formula (17) is satisfied $$1.1 < \beta tg6 < 2.0. \tag{17}$$

14. The image pick-up apparatus according to claim 13, wherein the sixth lens group GR6 at least includes one negative lens having negative refractive power and one positive lens having positive refractive power which are arranged in order from the object side, and when lateral magnification at the wide-angle end state of the sixth lens group GR6 is $\beta wg6$, the following conditional formula (18) is satisfied $$1.05 < \beta wg6 < 1.5. \tag{18}$$

* * * * *